(12) United States Patent
Kurata

(10) Patent No.: US 9,810,945 B2
(45) Date of Patent: Nov. 7, 2017

(54) LIGHT GUIDE PLATE AND SURFACE ILLUMINATION DEVICE

(71) Applicant: OMRON Corporation, Kyoto-shi, Kyoto (JP)

(72) Inventor: Gouo Kurata, Saitama (JP)

(73) Assignee: OMRON Corporation, Kyoto (JP)

( * ) Notice: Subject to any disclaimer, the term of this patent is extended or adjusted under 35 U.S.C. 154(b) by 135 days.

(21) Appl. No.: 14/919,294

(22) Filed: Oct. 21, 2015

(65) Prior Publication Data

US 2016/0109639 A1 Apr. 21, 2016

(30) Foreign Application Priority Data

Oct. 21, 2014 (JP) ................................ 2014-214918

(51) Int. Cl.
*G02F 1/1335* (2006.01)
*F21V 8/00* (2006.01)

(52) U.S. Cl.
CPC ..... *G02F 1/133615* (2013.01); *G02B 6/0016* (2013.01); *G02B 6/0038* (2013.01); *G02F 1/133609* (2013.01); *G02B 6/002* (2013.01); *G02B 6/0068* (2013.01)

(58) Field of Classification Search
CPC ......... G02F 1/133615; G02F 1/133524; G02F 1/133602; G02F 1/133603; G02F 1/133609; G02B 6/0016; G02B 6/0038
See application file for complete search history.

(56) References Cited

U.S. PATENT DOCUMENTS

| 8,427,603 B2 * | 4/2013 | Ishikawa | G02B 6/0018 349/65 |
| 8,848,138 B2 * | 9/2014 | Nakamoto | G02B 6/0016 349/62 |
| 9,075,171 B2 * | 7/2015 | Kurata | G02B 6/0016 |
| 2010/0123858 A1 * | 5/2010 | Han | G02B 6/0036 349/65 |

(Continued)

FOREIGN PATENT DOCUMENTS

JP 2014-146535 A 8/2014

OTHER PUBLICATIONS

Office Action in counterpart German Patent Application No. 10 2015 220 323.9 dated Sep. 21, 2016 (7 pages).

(Continued)

*Primary Examiner* — Dung Nguyen
(74) *Attorney, Agent, or Firm* — Osha Liang LLP

(57) ABSTRACT

A light guide plate has a light input end surface from which light is introduced, a light output surface that outputs light spread in a planar manner externally, a flat main light guiding body including the light output surface, a light conducting portion that has a maximum thickness greater than the thickness of the main light guiding body and includes the light input end surface, a first slanted surface provided on the light conducting portion on at least one of a surface near the light output surface and a surface opposite thereto, the first slanted surface inclined from a first location that is thicker than the main light guiding body toward the outer surface of the main light guiding body, and a plurality of first pattern elements provided on the light conducting portion on at least one of a surface near the light output surface and a surface opposite thereto.

26 Claims, 54 Drawing Sheets

(56) References Cited

U.S. PATENT DOCUMENTS

2013/0141669 A1  6/2013  Shinohara et al.
2014/0111743 A1  4/2014  Takemura et al.
2014/0185321 A1  7/2014  Chang et al.

OTHER PUBLICATIONS

Yi Wen Chang; "The Design of High Efficiency Light-Guide Plate with Multi Steps Wedge Structure"; IDW '13; FMCp-21; pp. 634-636 (3 pages).

* cited by examiner

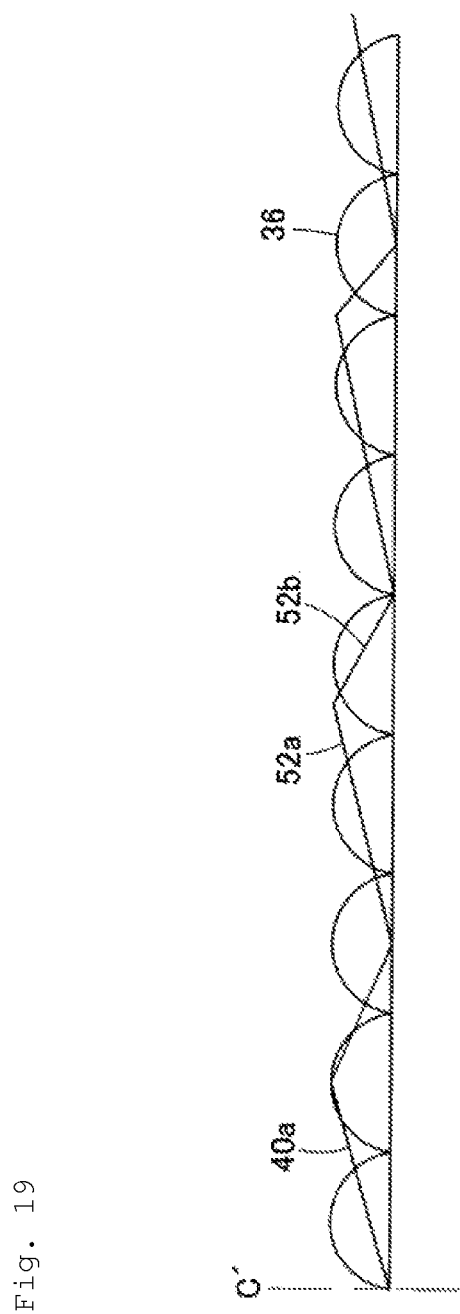

LIGHT GUIDE PLATE AND SURFACE ILLUMINATION DEVICE

BACKGROUND

Field

The present invention relates to a light guide plate and a surface illumination device, and more specifically, to a light guide plate and a surface illumination device that spread light emitted from a light source through a surface, and emit the light from a light output surface.

Related Art

Related Art: Example 1

FIG. 1 is a perspective view illustrating a surface illumination device disclosed in Japanese Unexamined Patent Publication No. 2014-146535. In the surface illumination device 11 in FIG. 1, a wedge-shaped light conducting portion 14, and a planar main light guiding body 15 are integrated to form the light guide plate 13. The light input end surface 16 of the light conducting portion 14 faces a light source 12. The upper surface of the light conducting portion 14 is formed as a slanted surface 17. A light output surface is formed on the upper surface of the main light guiding body 15.

The upper surface of the light conducting portion 14, i.e., the slanted surface 17 is provided with a light diffusing pattern 18 that broadens the directivity of the light reflected thereby in the transverse direction. A lenticular lens 20 is formed on the light output surface 19 of the main light guiding body 15. A plurality of V-shaped radial pattern elements, which are directivity conversion patterns 21 is provided at the end portion of the main light guiding body 15, i.e., the region sandwiched between the light output surface 19 and the slanted surface 17, while a non-patterned region 22 is provided in front of the light source 12.

As illustrated by the arrows in FIG. 1, the light from the light source 12 entering the light conducting portion 14 from the light input end surface 16 reflects from the upper and lower surfaces of the light conducting portion 14 and travels toward the thinner main light guiding body 15 in the surface illumination device 11. The light diffusing patterns 18 simultaneously broaden the directivity of the light in the width direction of the light conducting portion 14. The light guided into the main light guiding body 15 reflects from the directivity conversion patterns 21, the lenticular lens 20, and the lower surface of the main light guiding body 15 while travelling through the main light guiding body 15. At this point, the light incident on the directivity conversion patterns 21 reflects from the directivity conversion patterns 21 bent outward in the width direction to spread in the width direction of the light guide plate 13. A portion of the light bent outward due to the directivity conversion patterns 21 reflects from the side surfaces of the light guide plate 13 and returns to the center of the light guide plate 13. In this manner, the lenticular lens 20 widens the directivity of the light spreading throughout the main light guiding body 15 while ensuring the light exits substantially uniformly from the light output surface 19.

However, uneven luminance is more likely to occur in this kind of surface illumination device 11 when the position of the light source 12 shifts in the width direction. FIG. 3A, FIG. 3B, and FIG. 3C depict a simulation of the luminance distribution when the light source 12 is positioned at the center, shifted 0.1 mm from the center, shifted 0.2 mm from the center of the light input end surface 16 in the width direction, respectively. The pitch of the directivity conversion patterns 21 is roughly 0.025 mm in the simulations.

The luminance distribution for FIG. 3A is symmetric about the center of the light source 13 (i.e., the optical axis of the light source). In contrast, the luminance distribution for FIG. 3B is slightly asymmetrical, while the luminance distribution for FIG. 3C is markedly asymmetrical. Therefore, the shifted position of the light source tends to create less uniformity in the luminance distribution, leading to an uneven luminance in the surface illumination device.

The reason the shifted position of the light source tends to create the above-mentioned kind of asymmetrical luminance distribution is described with reference to FIG. 2A and FIG. 2B. The directivity conversion patterns 21 in the surface illumination device 11 form a radial pattern. Therefore when the position of the light source 12 coincides with the center of the directivity conversion patterns 21, the light reflects symmetrically therefrom as illustrated in FIG. 2A. However, when the position of the light source 12 is shifted from the center of the directivity conversion patterns 21, the directions in which the directivity conversion patterns 21 reflect the light become asymmetrical as illustrated in FIG. 2B, and the directions of the reflected light varies greatly from the directions illustrated in FIG. 2A. Therefore, the guiding direction in the main light guiding body 15 bends as represented by the arrow in FIG. 3C, and the luminance distribution is asymmetrical.

Related Art: Example 2

FIG. 4A and FIG. 4B are perspective views illustrating a portion of a light guide plate disclosed in the "The Design of Efficiency Light-Guide Plate with Multi Steps Wedge Structure", Yi Wen Chang (Auto Technology Center, AU Optronics Corporation), IDW '13 FM Cp-21, p. 634-636. Two types of patterns 27, 28 are provided on the slanted surface 17 formed on the upper surface of the light conducting portion 14 in the light guide plate 26. One of the patterns 27 is relatively short and extends from the light input end surface 16; the other of the patterns 28 is relatively long and extends from the light input end surface 16. The pattern 27 and the pattern 28 are lined up next to each other, and the inclination of the ridges in the pattern 28 is smaller than the inclination of the ridges in the pattern 27.

FIG. 5 illustrates a luminance distribution in the light output region in a surface illumination device using the light guide plate 26. When a distance D from the light input end surface 16 to the end of the light output surface 19 is small (in the simulation, D=2.5 mm) in a light guide plate 26 constructed as illustrated in FIGS. 4A and 4B, a high luminance region is created at the front surface of the light source 12 at the end portion of the light output surface 19, resulting in a non-uniform luminance distribution as illustrated in FIG. 5.

Patent Document 1: Japanese Unexamined Patent Publication No. 2014-146535

Non-Patent Reference 1: "The Design of Efficiency Light-Guide Plate with Multi Steps Wedge Structure", Yi Wen Chang (Auto Technology Center, AU Optronics Corporation), IDW '13 FM Cp-21, p. 634-636

SUMMARY

A light guide plate according to one or more embodiments of the present invention and a surface illumination device according to one or more embodiments of the present invention may improve the uniformity of a luminance distribution of the light output surface thereon. A light guide plate according to one or more embodiments of the present invention and a surface illumination device according to one or more embodiments of the present invention may suppress losses in the uniformity of the luminance distribution due to the shifted position of the light source.

A light guide plate according to one or more embodiments of the present invention includes a light input end surface for introducing light; a light output surface for outputting light spread in a planar manner externally; a flat main light guiding body including the light output surface; a light conducting portion that has a maximum thickness greater than the thickness of the main light guiding body and includes the light input end surface; a first slanted surface provided on the light conducting portion on at least one of a surface near the light output surface and a surface opposite thereto, the first slanted surface inclined from a first location that is thicker than the main light guiding body toward the outer surface of the main light guiding body; and a plurality of first pattern elements provided on the light conducting portion on at least one of a surface near the light output surface and a surface opposite thereto, the first pattern elements provided between a second location that is thicker than the main light guiding body and closer to the main light guiding body than the first location, and the end portion of the main light guiding body; the first pattern elements each extending parallel to a direction orthogonal to the light input end surface when viewing the light output surface orthogonally, and ridges on the first pattern elements incline from the second location toward the outer surface of the main light guiding body; and when the main light guiding body is viewed from a side surface, the first pattern elements or the ridges between the first pattern elements incline at an average inclination smaller than the maximum inclination of the first slanted surface.

The light guide plate according to the embodiments is provided with a light conducting portion that has a maximum thickness greater than the thickness of a main light guiding body, and a first slanted surface provided on the light conducting portion inclined from a first location that is thicker than the main light guiding body toward the outer surface of the main light guiding body. Therefore light from the light source may be efficiently taken into the light conducting portion, and the light taken into the light conducting portion guide into the thinner light guide plate. A uniform luminance distribution may be realized as a result without sacrificing the light use efficiency. The light guide plate is also provided with a plurality of first pattern elements starting from a location closer to the main light guiding body than the first slanted surface. The first pattern elements extend parallel to a direction orthogonal to the light input end surface when the light output surface is viewed orthogonally; and the ridges between the first pattern elements incline at an average inclination smaller than the maximum inclination of the first slanted surface when the main light guiding body is viewed from a side surface. Therefore, the direction light reflects from a first pattern (the collection of first pattern elements) tends not to change even when the position of a light source arranged opposite the light input end surface shifts in the width direction of the light input end surface. Thus, uneven luminance due to a shifted light source may be prevented from occurring. The unevenness may also be reduced even when there is a short distance between the light source and the light output surface.

The light guide plate according to the embodiments is configured such that the average inclination of the first pattern elements or the ridges between the first pattern elements is no more than 3.5°. According to the embodiment, the hotspot size may be configured to approach the value 1, mitigating uneven luminance in the light guide plate.

The light guide plate according to the embodiments is configured so that with the outer surface of the main light guiding body as a reference the height of a second location is no more than one third the height of the first location. According to the embodiment, the hotspot size may be configured to approach the value 1, mitigating uneven luminance in the light guide plate.

The light guide plate according to another embodiment is further provided with a second slanted surface provided on the light conducting portion on at least one of a surface near the light output surface and a surface opposite thereto, wherein the second slanted surface is inclined from the second location toward the outer surface of the main light guiding body. The average inclination of the second slanted surface is smaller than the maximum inclination of the first slanted surface, and the plurality of first pattern elements is formed on the second slanted surface. The embodiment reduces the size of the valleys and ridges in the first pattern, thereby simplifying production of the first pattern.

Additionally, in this embodiment, the average inclination of the second slanted surface may be no more than 3.5°. According to the embodiment, the hotspot size may be configured to approach the value 1, mitigating uneven luminance in the light guide plate.

Furthermore in this embodiment, the vertical interval of the second slanted surface may be no more than one third of the vertical interval between the outer surface at the thickest location of the light conducting portion and the outer surface at the thinnest location of the light conducting portion. According to the embodiment, the hotspot size may be configured to approach the value 1, mitigating uneven luminance in the light guide plate.

The light guide plate according to another embodiment is configured to include a plurality of second pattern elements formed on the first slanted surface. The second pattern elements, also provided on the first slanted surface in the embodiment improve the optical properties of the light guide plate.

The light guide plate according to another embodiment is configured such that for at least a portion of the first pattern elements, the cross sections of the first pattern elements parallel to the light input end surface are asymmetrical. The embodiment allows light reflected by the first pattern elements to be controlled to travel asymmetrically.

In the embodiment the first pattern element may be composed of at least two inclined surfaces having different inclination directions, and the plurality of first pattern elements may be arranged along the width direction on the second slanted surface. In a cross section of the first pattern elements parallel to the light input end surface, when a normal line is projected from each of the inclined surfaces in the first pattern element from the inside to the outside, in regions sandwiching a center line passing through the center of and orthogonal to the light input end surface, in each region the total of the transverse widths for the inclined surfaces where the normal lines projecting therefrom inclines towards the center line may be larger than the total of the transverse widths for the inclined surfaces where the normal line projecting therefrom inclines in an opposite direction away from the center line. In such an embodiment less light leaks from the directivity conversion patterns while the directivity of the light reflected from the directivity conversion patterns is efficiently bent outward in the width direction.

In the embodiment the first pattern element may be composed of at least two inclined surfaces having different inclination directions, and the plurality of first pattern elements may be arranged along the width direction on the second slanted surface. In a cross section of the first pattern elements parallel to the light input end surface, when a normal line is projected from each of the inclined surfaces in the first pattern element from the inside to the outside, in regions sandwiching a center line passing through the center of and orthogonal to the light input end surface, in each region the average angle of the angles formed between the normal line belonging to an inclined surface where the normal line projecting therefrom is inclined in the opposite direction away from the center line and a direction orthogonal to the light output surface may be greater than the average angle of the angles formed between the normal line belonging to an inclined surface where the normal line projecting therefrom is inclined toward the center line and a direction orthogonal to the light output surface. In such an embodiment less light leaks from the directivity conversion patterns while the directivity of the light reflected from the directivity conversion patterns is efficiently bent outward in the width direction.

The light guide plate according to another embodiment may be further configured such that when regions bordering both sides of a center line passing through the center of and orthogonal to the light input end surface are divided by a dividing line located between the center line and a side surface of the light guide plate equidistant from the center line and the side surface and parallel to the center line, the total surface area of a region between the center line and the dividing line containing the first pattern elements is smaller than the total surface area of a region between the dividing line and the side surface containing the first pattern elements. Less light leaks from the directivity conversion patterns in the embodiment while the directivity of the light reflected from the directivity conversion patterns is efficiently bent outward in the width direction.

In the above mentioned embodiments first pattern elements need not be provided in a region containing the center line. Additionally, first pattern elements need not be provided in a region sandwiched between two dividing lines located on each side of the center line.

The light guide plate according to another embodiment may be further configured such that the first pattern elements are V-shaped grooves. Design and production may be simplified when the first pattern elements are V-shaped grooves.

In the embodiment, an apex angle between adjacent first pattern elements may be 90° to 170°, inclusive. According to the embodiment, the hotspot size may be configured to approach the value 1, mitigating uneven luminance in the light guide plate.

The light guide according to the embodiment may be further configured such that the second pattern elements are V-shaped grooves; and an apex angle between adjacent first pattern elements is equal to or greater than an apex angle between adjacent second pattern elements.

The light guide plate according to another embodiment configured such that the first pattern elements or the ridges between adjacent first pattern elements, and the second pattern elements or the ridges between adjacent second pattern elements appear to include first pattern elements or ridges between adjacent first pattern elements, and second pattern elements or ridges between adjacent second pattern elements that are arranged along a straight line when the outer surface of the main light guiding body is viewed from a direction orthogonal thereto. The embodiment simplifies the production of the first and second patterns.

In the light guide plate according to the above-mentioned embodiments a pitch at which the first pattern elements are arranged may be half (one half) a pitch at which the second pattern elements are arranged. Furthermore, the pitch at which the first pattern elements are arranged may differ from the pitch at which the second pattern elements are arranged, and the first pattern elements or the ridges between adjacent first pattern elements, and the second pattern elements or the ridges between adjacent second pattern elements may be periodically arranged along a straight line. In any case, as a result the first pattern elements or the ridges between adjacent first pattern elements, and the second pattern elements or the ridges between the second pattern elements will coincide for every given number of pattern elements.

The light guide plate according to another embodiment is configured to include a plurality of lenticular lens forms. Providing lenticular lens broadens the directivity of the light output from the light output surface in the width direction of the lenticular lens.

In the embodiment the end portions of a plurality of lenticular lens and the end portions of the plurality of first pattern elements may intersect.

A surface illumination device according to the embodiments includes a light guide plate according to the embodiments and a light source arranged opposite the light input end surface of the light guide plate. According to the embodiment, a liquid crystal display device employing the same may achieve high luminance and a thin profile while ensuring the brightness of the screen is uniform.

The surface illumination device according to the embodiments includes a plurality of individual light sources arranged opposite the light input end surface. Taking an arrangement interval between the light sources as P, and a refractive index of the light guide plate as n, the first pattern elements are within a region that is a distance:

$$P/(2 \cdot \arcsin(1/n))$$

from the front surfaces of the light sources. When the region in which the directivity conversion patterns are formed extends further than $P/(2 \cdot \arcsin(1/n))$ away from the light emitting end surface of the light source, the light exiting the light source enters a region in front of an adjacent light source, and the light use efficiency deteriorates.

A liquid crystal display device according to the embodiments is provided with a surface illumination device according to the embodiments and a liquid crystal panel. The liquid crystal display device according to the embodiments achieves high luminance and a thin profile while ensuring the brightness of the screen is uniform.

Finally, the liquid crystal display device according to the embodiments may be used in a mobile device or an electronic device.

Embodiments of the present invention may include combinations, as appropriate, of the above-described constituent elements. Those skilled in the art will appreciate numerous variations of embodiments of the present invention are possible by combining these constituent elements.

BRIEF DESCRIPTION OF THE DRAWINGS

FIG. 19 is a schematic diagram illustrating how the end the portions of a directivity conversion pattern and lenticular lens overlap;

DETAILED DESCRIPTION

Embodiments of the present invention are described below with reference to the attached drawings. The invention is not limited to the embodiments described below and may be modified in various ways insofar as the modifications are within the spirit and the scope of the invention. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 6:
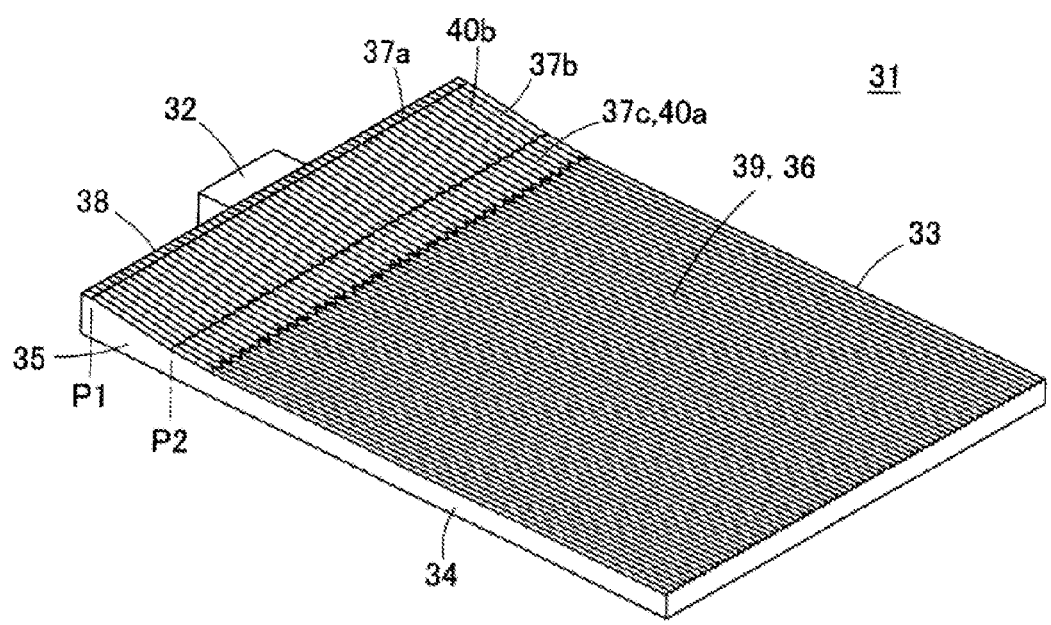
FIG. 6 is a perspective view of a surface illumination device according to a first embodiment.
Figure 7A:
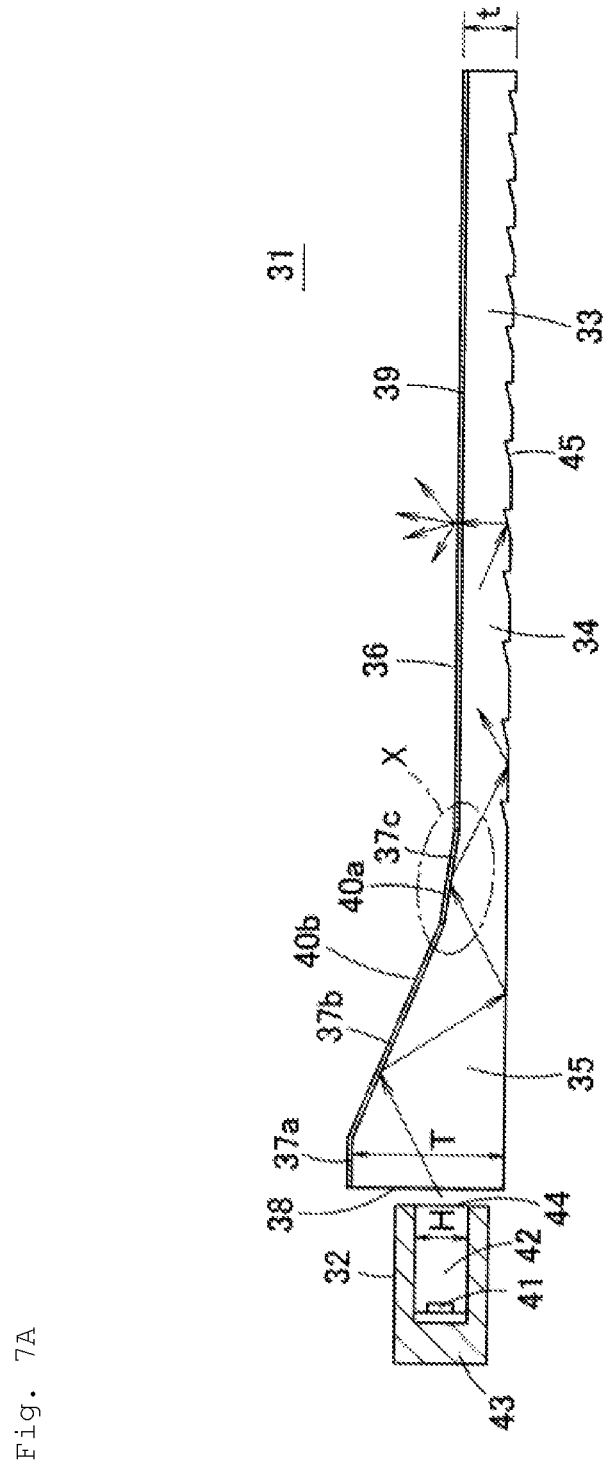
FIG. 7A is a cross-sectional view of the surface illumination device illustrated in FIG. 6.
Figure 7B:
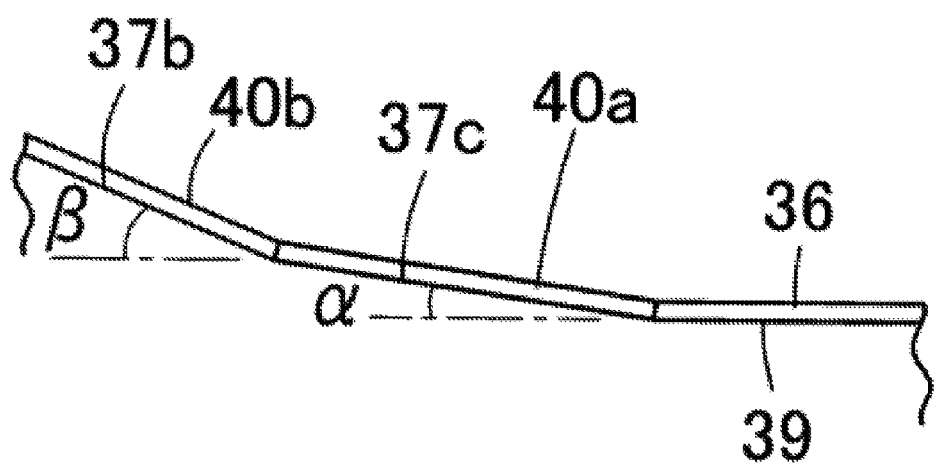
FIG. 7B is an exploded view of section X in FIG. 7A.

A surface illumination device 31 according to an embodiment is described below with reference to FIGS. 6 and 7. FIG. 6 is a perspective view illustrating the surface illumination device 31 according to the first embodiment. FIG. 7A is a cross-sectional view of the surface illumination device 31 illustrating the behavior of light within a plane orthogonal to the light input end surface 38 and the light output surface 39 in the light guide plate 33. FIG. 7B is an exploded view of section X in FIG. 7A.

The surface illumination device 31 is made from a light source 32 and a light guide plate 33. The light source 32 emits has one or a plurality of individual LEDs built-in and emits white light. As illustrated in FIG. 7A, the LED 41 is encapsulated in a transparent sealing resin 42. The sealing resin 42 is covered in a white resin 43 with exception of the front surface. The front surface is exposed from the white resin and functions as a light output window 44 (light emitting surface). The light source 32 is a smaller width compared to the width of the light guide plate 33, is referred to as a point light source compared to a line light source such as a cold-cathode tube.

The light guide plate 33 is composed of a thin, flat plate serving as the main light guiding body 34, and a substantially wedge-shaped light conducting portion 35. The light conducting portion 35 is provided at an end of the main light guiding body 34 and continues therefrom. The light guide plate 33 may be integrally formed from a transparent resin having a high refractive index such as acrylic resin, polycarbonate resin (PC), alkene material, poly methyl methacrylate (PMMA), and the like.

The light conducting portion 35 is the thicker and substantially wedge-shaped portion of the light guide plate 33 with the light input end surface 38 is the end surface thereof. The light output window 44 of the light source 32 faces a portion of the light input end surface 38 (i.e., the center in the width direction). The height T of the end surface of the light conducting portion 35 (i.e. the light input end surface 38) is greater than or equal to the height H of the light output window 44; therefore, light emitted from the light source 32 efficiently enters from the light input end surface 38 into the light conducting portion 35, and increases the light use efficiency of the surface illumination device 31.

The upper surface of the light conducting portion 35 (the surface on the same side as the light output surface 39 of the main light guiding body 34) is configured as a horizontal surface 37a, a first slanted surface 37b, and a second slanted surface 37c in order from the light input end surface 38. The horizontal surface 37a is parallel to the lower surface of the light conducting portion 35, and extends from the upper end of the light input end surface 38 to a first location P1. The first location is any desired location on the light conducting portion 35 that is thicker than the main light guiding body 34. The first slanted surface 37b inclines from the first location P1 to a second location P2 in the light conducting portion 35. The second location P2 is at a portion on the light conducting portion 35 that is thicker than the main light guiding body 34 and is closer to the main light guiding body 34 than the first location P1. The second slanted surface 37c inclines from the second location P2 to an end of the main light guiding body 34. The horizontal surface 37a is a relatively short region and may be omitted from the configuration. The second slanted surface 37c is shorter than the first slanted surface 37b. The length of the second slanted surface 37c is the horizontal distance between the second location and an end of the main light guiding body 34, while the length of the first slanted surface 37b is the horizontal distance between the first location P1 and the second location. As also illustrated in FIG. 7B, the inclination of the second slanted surface 37c (generally, the average inclination, a), is smaller than the maximum inclination β of the first slanted surface 37b. That is, the second slanted surface 37e inclines gradually.

The horizontal surface 37a and the first slanted surface 37b include a plurality of second pattern elements; in other words, the horizontal surface 37a and the first slanted surface 37b include a plurality of light diffusing patterns 40b formed thereon. The light diffusing patterns 40b extend along the inclination direction of the first slanted surface 37b and are aligned parallel along the width direction of the light conducting portion 35. The cross sections of the light diffusing patterns 40b parallel to the light input end surface 38 are symmetrical V-shaped groove patterns. Note that the light diffusing patterns 40b may be a lenticular lens-like pattern, or a randomly shaped pattern.

The second slanted surface 37c includes a plurality of first pattern elements, that is, a plurality of directivity conversion patterns 40a are formed thereon. The directivity conversion patterns 40a extend along the inclination direction of the second slanted surface 37c and are aligned parallel along the width direction of the light conducting portion 35. The cross sections of the directivity conversion patterns 40a parallel to the light input end surface 38 are symmetrical V-shaped groove patterns.

When the directivity conversion patterns 40a and the light diffusing patterns 40b are identically shaped patterns, e.g. when the patterns are V-shaped groove patterns, according to one or more embodiments of the present invention, the directivity conversion patterns 40a are configured with the same arrangement pitch as the light diffusing patterns 40b so that when viewed from above, the directivity conversion patterns 40a and the light diffusing patterns 40b (especially the ridges between the V-shaped grooves) appear to line up along a straight line. Arranging the directivity conversion patterns 40a and the light diffusing patterns 40b along a straight line simplifies producing the patterns on the light conducting portion 35.

The main light guiding body 34 takes up a majority of the surface area of the light guide plate 33. The thickness t of the main light guiding body 34 is thinner than the maximum thickness T of the light conducting portion 35. Therefore, the light guide plate 33 may have a thin profile. The main light guiding body 34 is a planar shape with parallel front and rear surfaces, and the thickness thereof is substantially uniform. A lenticular lens 36 is formed on the light output surface 39 of the main light guiding body 34. The lenticular lens 36 are convex lens extending parallel to the length direction of the main light guiding body 34 and arranged in parallel along the width direction of the main light guiding body 34. The lenticular lens 36 broadens the directivity of the light emitted from the light output surface 39 in the transverse direction. The main light guiding body 34 is also provided with a light output portion 45 on the lower surface thereof. Although FIG. 7A illustrates the light output portion 45 as a triangular groove pattern, the light output portion 45 may be any desired peak and valley pattern created by sandblasting, photographic printing of diffusion ink, or providing a diffraction grating pattern. The light output portion 45 may be provided on the light output surface 39 in the main light guiding body 34, or may be provided on a surface opposite the light output surface 39.

Note that for convenience, optical elements such as the directivity conversion patterns 40a, the light diffusing patterns 40b, and the lenticular lens 36, and the like are depicted with larger sizes in the drawings; however, in reality these elements are fine patterns rendered on the micron level.

An example of the realistic dimensions of one or more embodiments of the present invention is listed below; however, a surface illumination device according to the invention is not limited to these dimensions.

Width (w), light output window 44 of light source 32: 2 mm
Width, light guide plate 33: 4.7 mm
Maximum Height, light conducting portion 35: 0.4 mm
Distance, light input end surface 38 to second location P2: 1 mm
Length, light conducting portion 35: 1.5 mm
Height (t), main light guiding body 34: 0.23 mm
Distance (D), light input end surface 38 to region useable for display 2.5 mm
Refractive Index (n), light guide plate 33: 1.59

In a surface illumination device 31 with the above-described construction, as depicted by the arrows in FIG.

7A, the light emitted from the light source 32 enters the light conducting portion 35 from the light input end surface 38, reflects at the upper and lower surfaces of the light conducting portion 35, and propagates through the thin main light guiding body 34. The light guided to the main light guiding body 34 reflects from the directivity conversion patterns 40a, the lenticular lens 36, or the lower surface of the main light guiding body 34 while being guided through the main light guiding body 34. The light is further reflected or diffused by a light output portion 45 and is substantially uniform when exiting from the light output surface 39.

At this point the light diffusing patterns 40b broadens the directivity of the light reflected thereby in the transverse direction, thus preventing the side edge portions of the light output surface 39 from darkening. In addition, providing these light diffusing patterns 40b also reduces the likelihood that light will leak out from the light conducting portion 35, allowing the light that enters the light conducting portion 35 from the light source 32 to propagate to the main light guiding body 34 with little loss, increasing the luminance of the surface illumination device 31.

Figure 5:
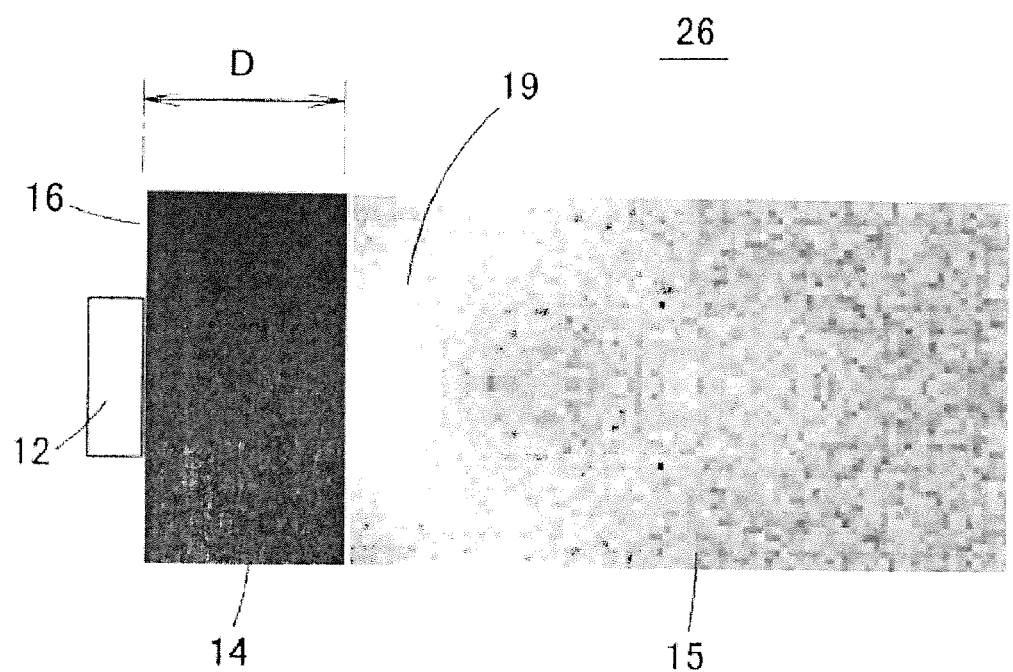
FIG. 5 illustrates the luminance distribution of a surface illumination device using the light guide plate in FIGS. 4A-4B.
Figure 8:
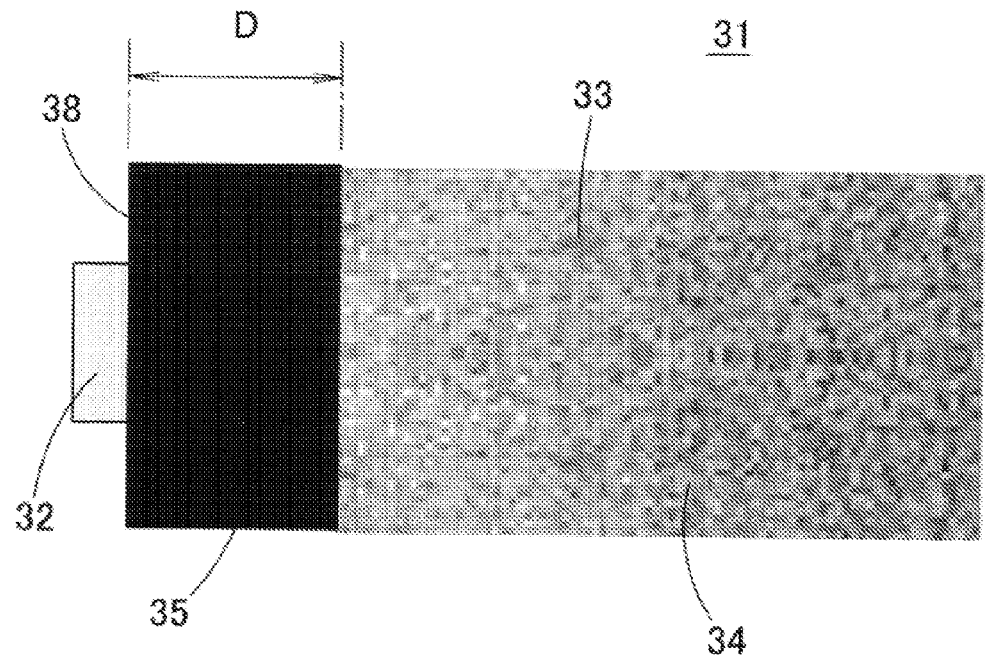
FIG. 8 illustrates a luminance distribution for a surface illumination device according to the first embodiment.

The directivity conversion patterns 40a also broaden the directivity of the light reflected thereby in the transverse direction while reducing the likelihood of light leaking out from the light conducting portion 35. Furthermore, placing the directivity conversion patterns 40a behind the light diffusing patterns 40b allows independent control of the amount of light output and the luminance distribution of the light output from the light output surface 39. Accordingly, adding the directivity conversion patterns 40a further improves luminance uniformity compared to providing only the light diffusing patterns 40b. FIG. 8 illustrates a luminance distribution for the light output surface 39 in the surface illumination device 31 under conditions identical to those in FIG. 5. As can be understood on comparison with FIG. 5, the surface illumination device 31 of the first embodiment achieves a uniform luminance distribution despite the shorter distance to the light source 32.

Figure 1:
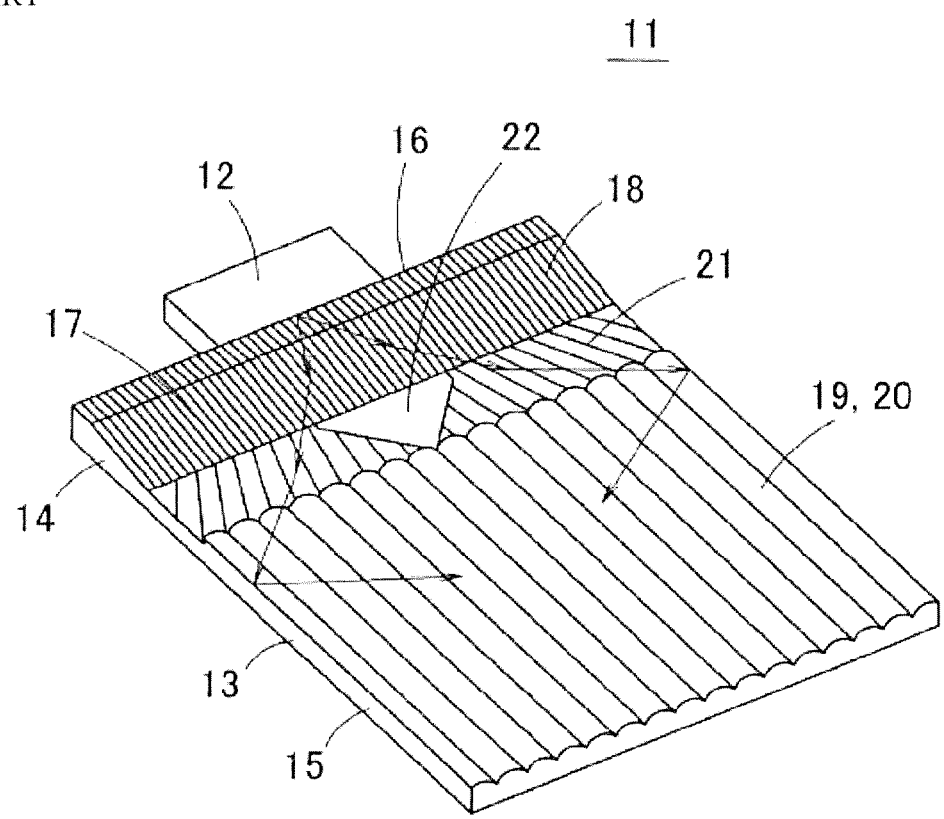
FIG. 1 is a perspective view of a conventional surface illumination device.
Figure 2A:
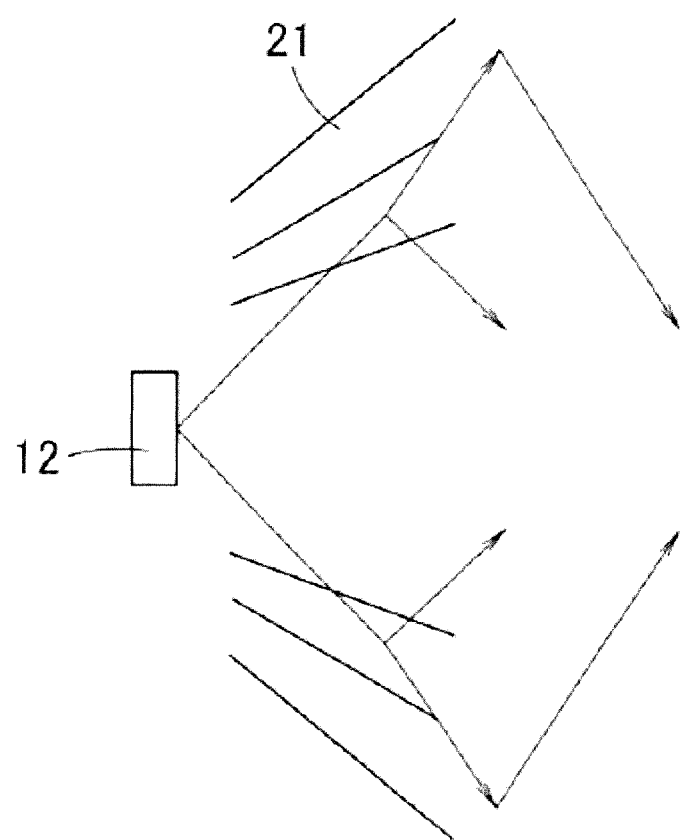
FIG. 2A and FIG. 2B are diagrams for explaining the issues with the conventional surface illumination device illustrated in FIG. 1.
Figure 2B:
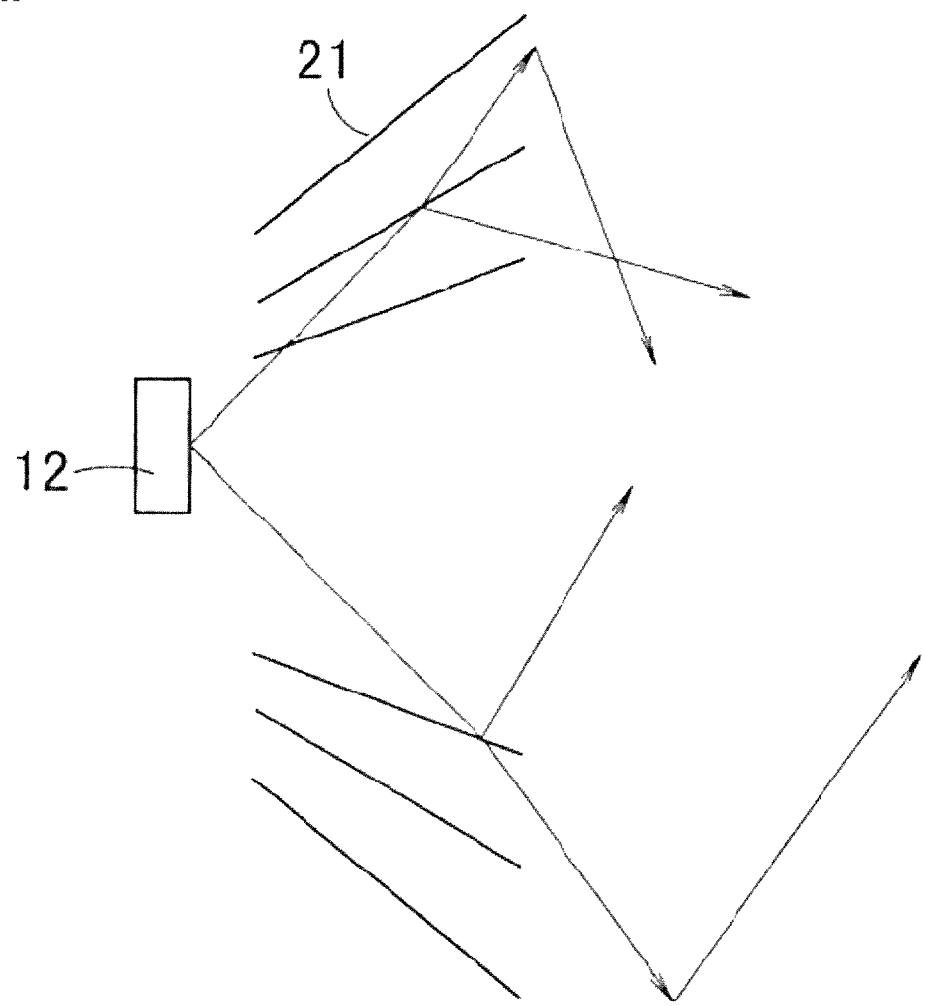
Figure 3A:
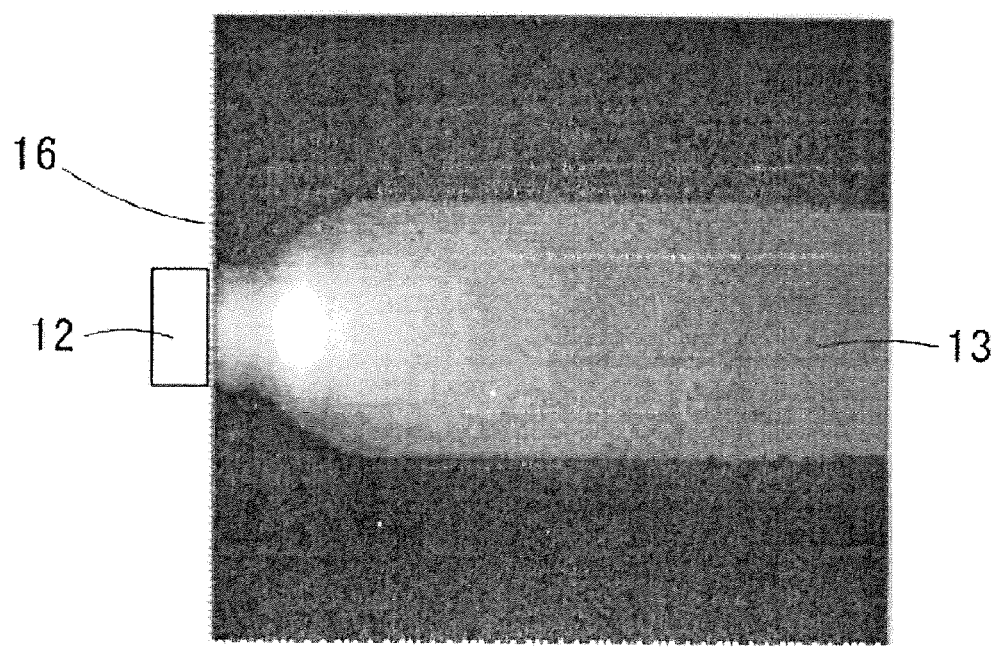
FIG. 3A, FIG. 3B, and FIG. 3C illustrate the variations in the luminance distribution of the light output surface when the position of the light source is shifted in the surface illumination device illustrated in FIG. 1.
Figure 3B:
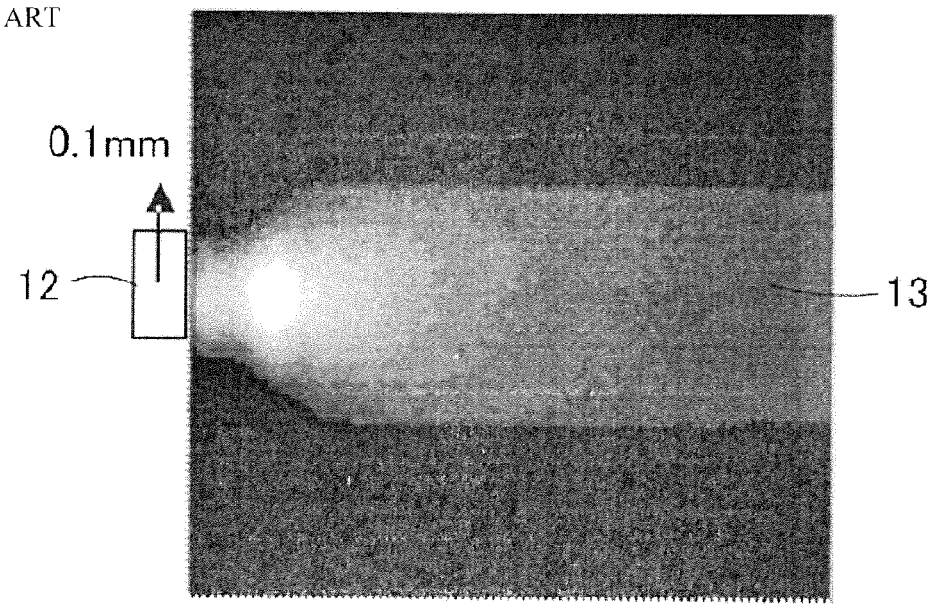
Figure 3C:
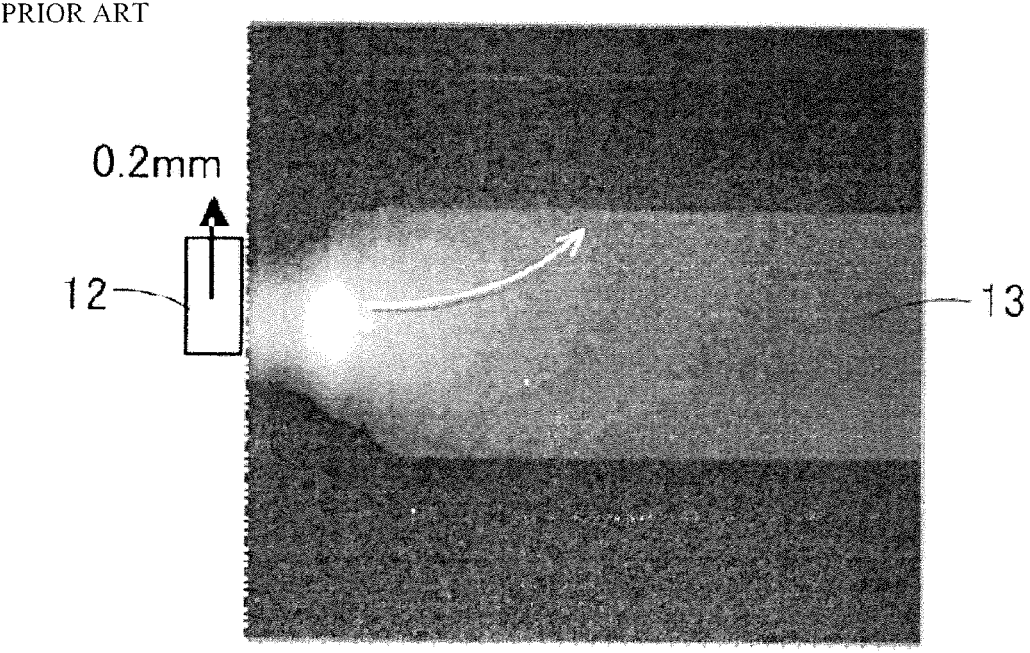
Figure 4A:
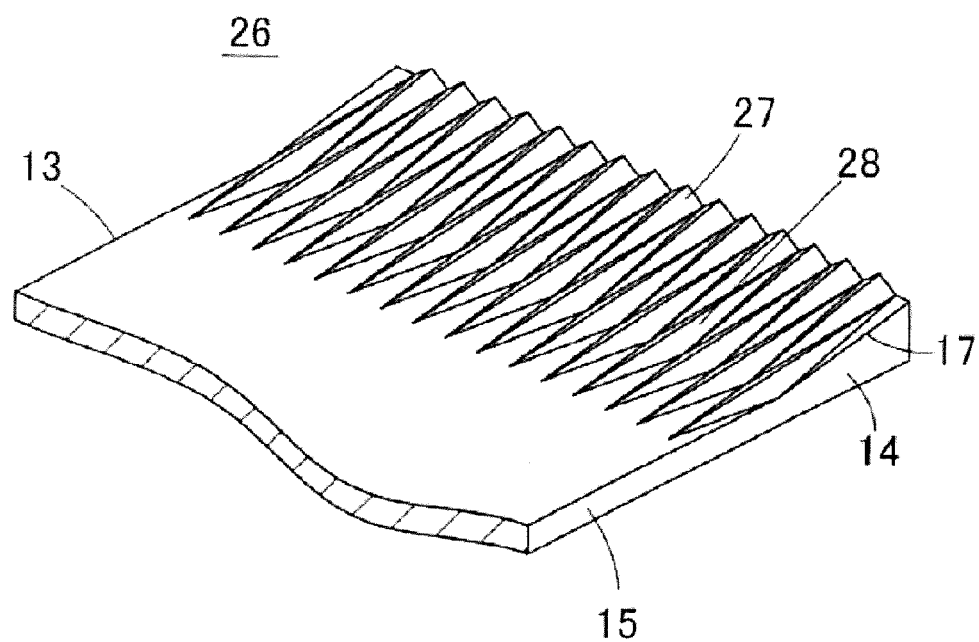
FIG. 4A is a perspective view illustrating a portion of another conventional light guide plate.
Figure 4B:
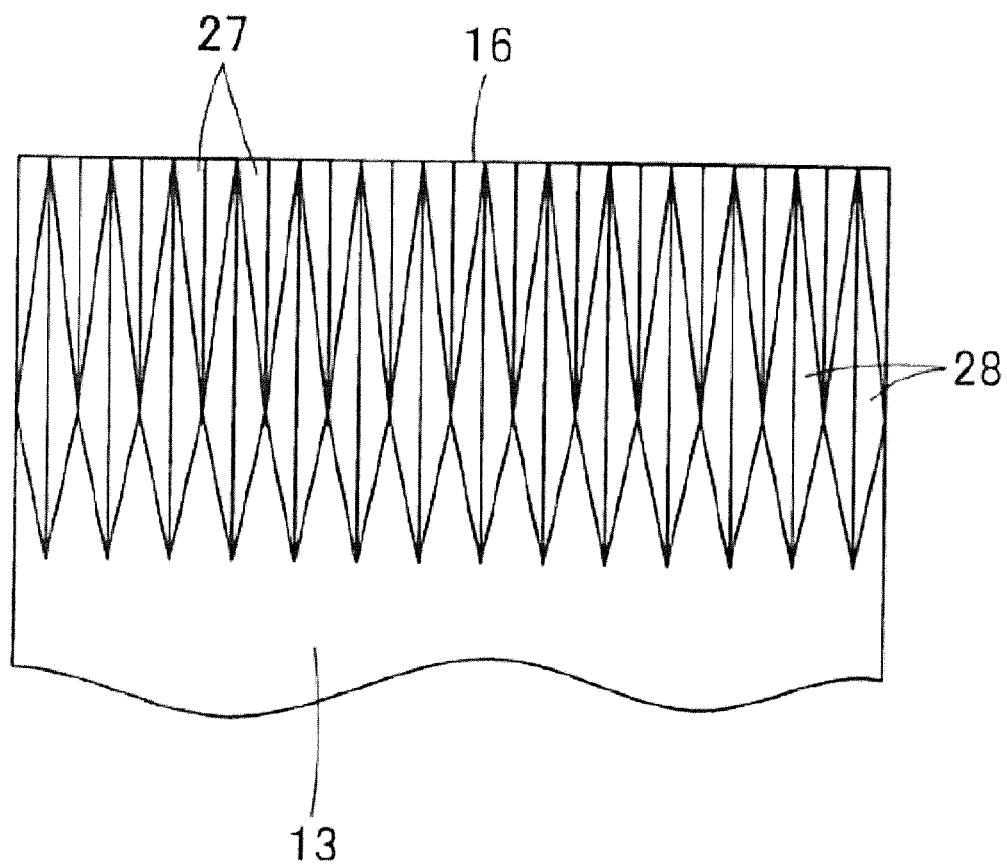
FIG. 4B is a plan view of the light guide plate in FIG. 4A.
Figure 9A:
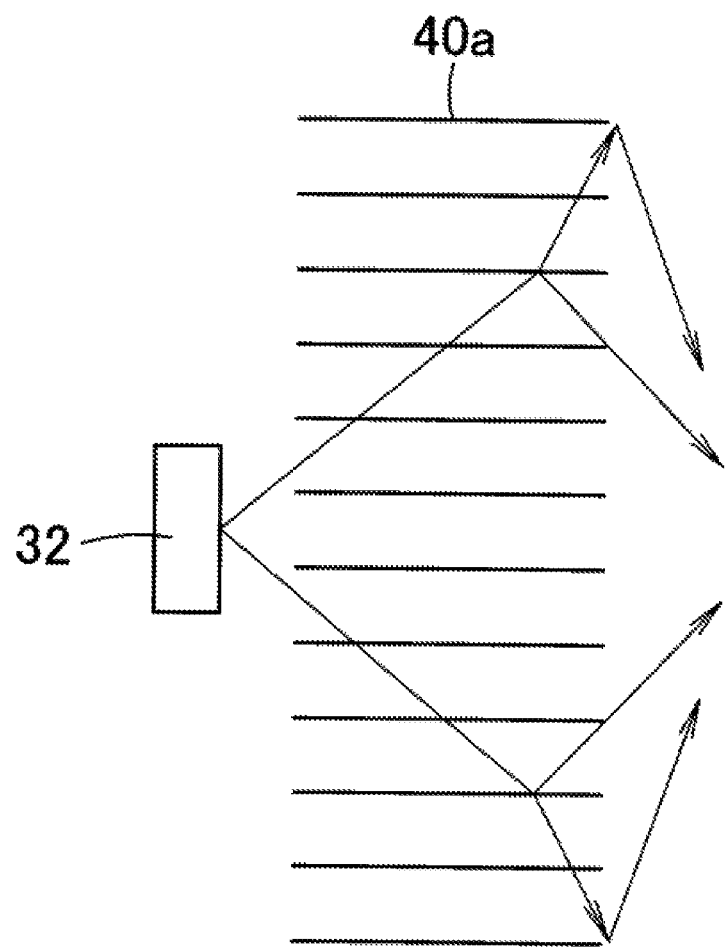
FIG. 9A is a schematic view illustrating the behavior of light when the light source is positioned at the center of a light output end surface.
Figure 9B:
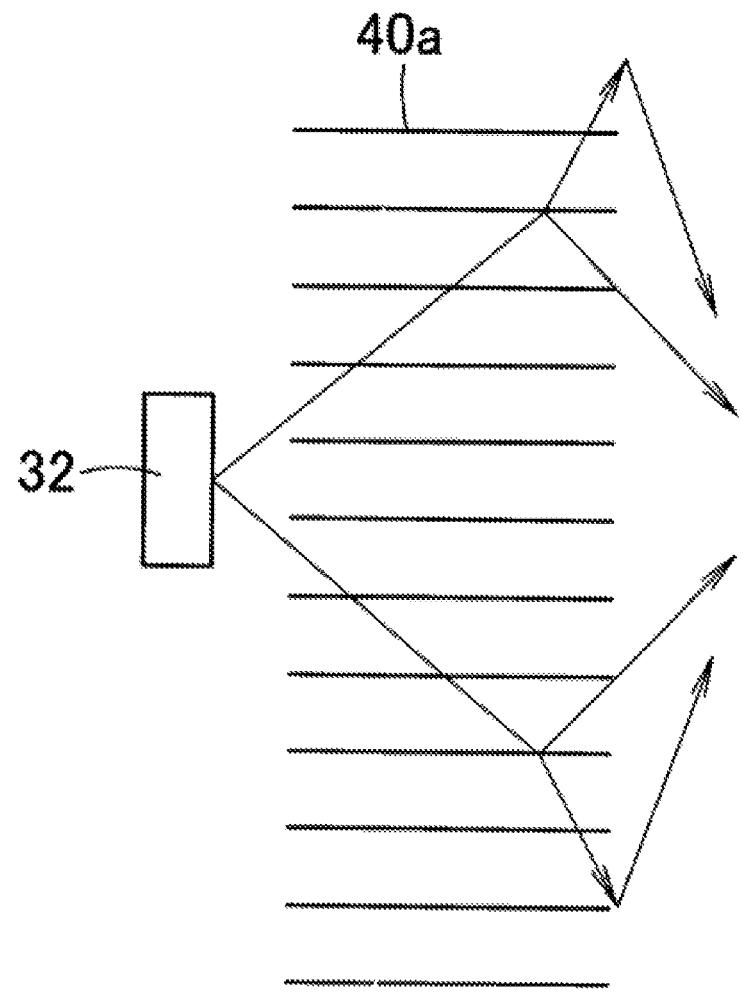
FIG. 9B is a schematic view illustrating the behavior of light when the light source is positioned shifted from the center of a light output end surface.
Figure 10A:
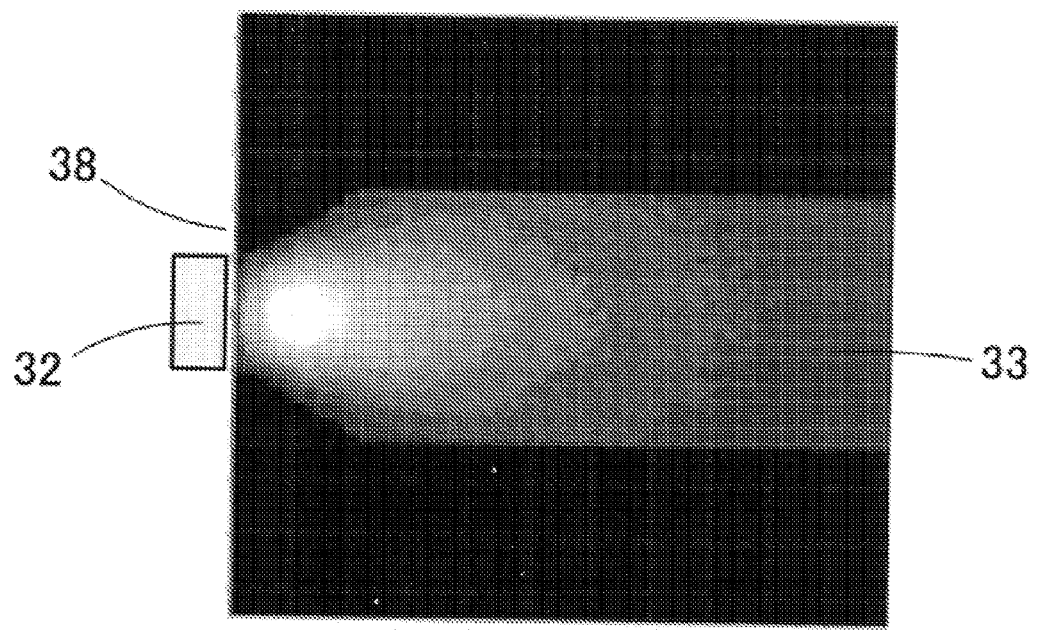
FIG. 10A, FIG. 10B, and FIG. 10C illustrate the variations in the luminance distribution of the light output surface when the position of the light source is shifted in the surface illumination device illustrated in FIG. 6.
Figure 10B:
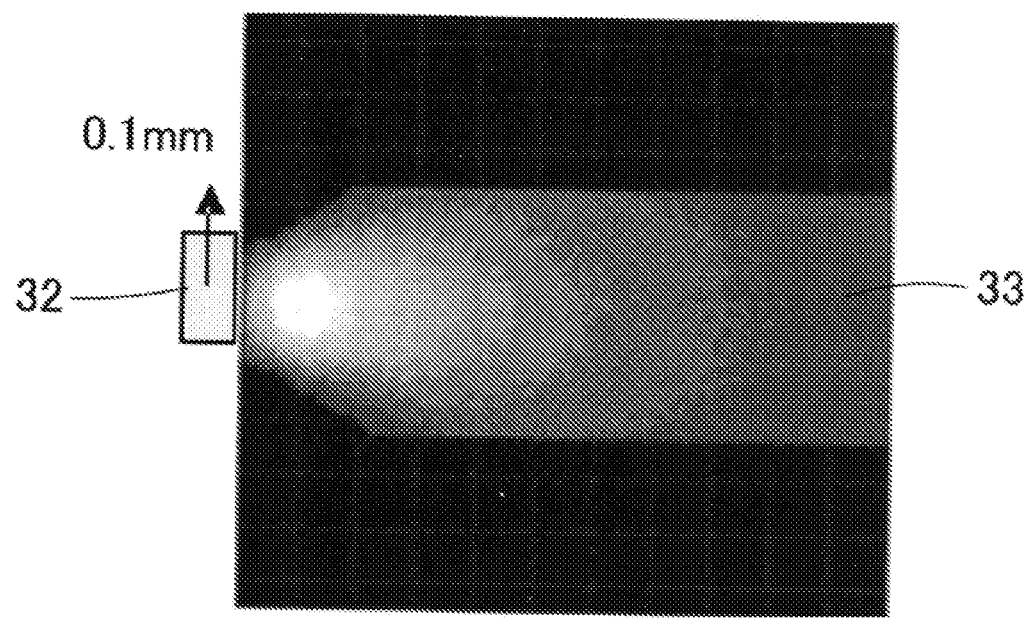
Figure 10C:
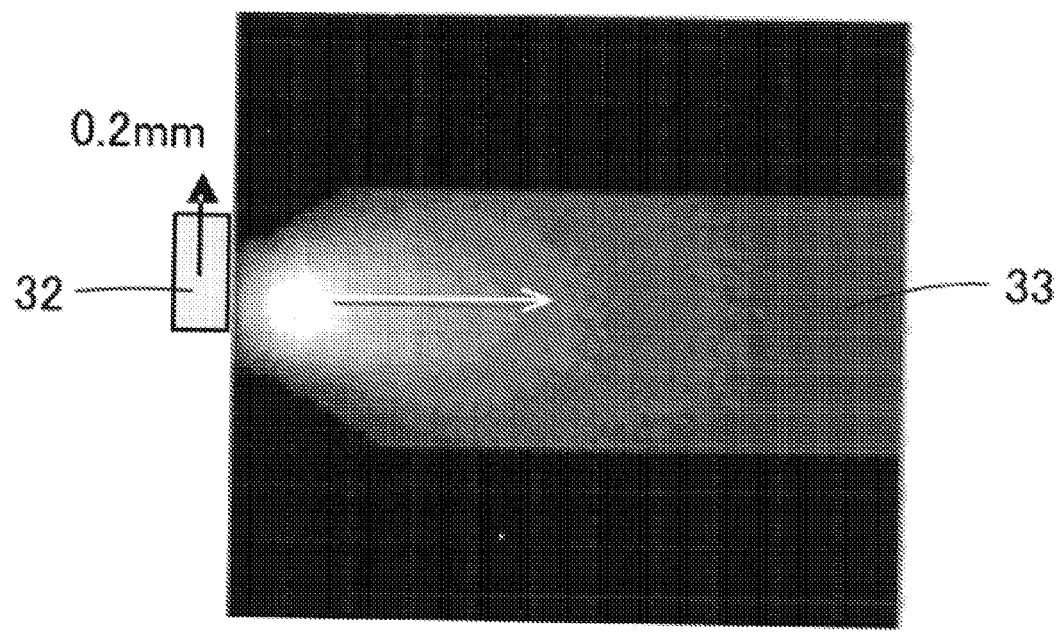

Furthermore, given that the directivity conversion patterns 40a are aligned parallel to each other at a constant pitch, the luminance will tend not to be uneven even if the position of the light source 32 shifts. FIG. 9A is a schematic view illustrating the behavior of light when the light source 32 is positioned at the center of a light input end surface 38. FIG. 9B is a schematic view illustrating the behavior of light when the light source 32 is positioned shifted from the center of a light input end surface 38. The directivity conversion patterns 40a are aligned parallel to each other at a constant pitch in the surface illumination device 31. Therefore, even if the light source 32 is shifted in a transverse direction, the positional relationship with the directivity conversion patterns 40a does not change substantially. The positional relationship between the light source 32 and the directivity conversion patterns 40a does not particularly change when the light source 32 is shifted by an integer multiple of the pitch of the directivity conversion patterns 40a. Therefore, even if the position of the light source 32 shifts, the light behavior remains substantially unaffected and does not influence the luminance distribution of the light output surface 39. FIG. 10A, FIG. 10B, and FIG. 10C depict a simulation of the luminance distribution when the light source 32 is positioned at the center, when the light source 32 is shifted 0.1 mm from the center, and when the light source 32 is shifted 0.2 mm from the center of the light input end surface 38, respectively. The directivity conversion patterns 40a are formed in parallel on the surface illumination device 31. Therefore, as illustrated in FIG. 10B and FIG. 10C, light spreads evenly even when the position of the light source 32 shifts, and does not curve as illustrated in FIG. 3C. Consequently, the shifted position of the light source tends not to generate uneven luminance, and allows for a uniform luminance distribution.

Figure 11:
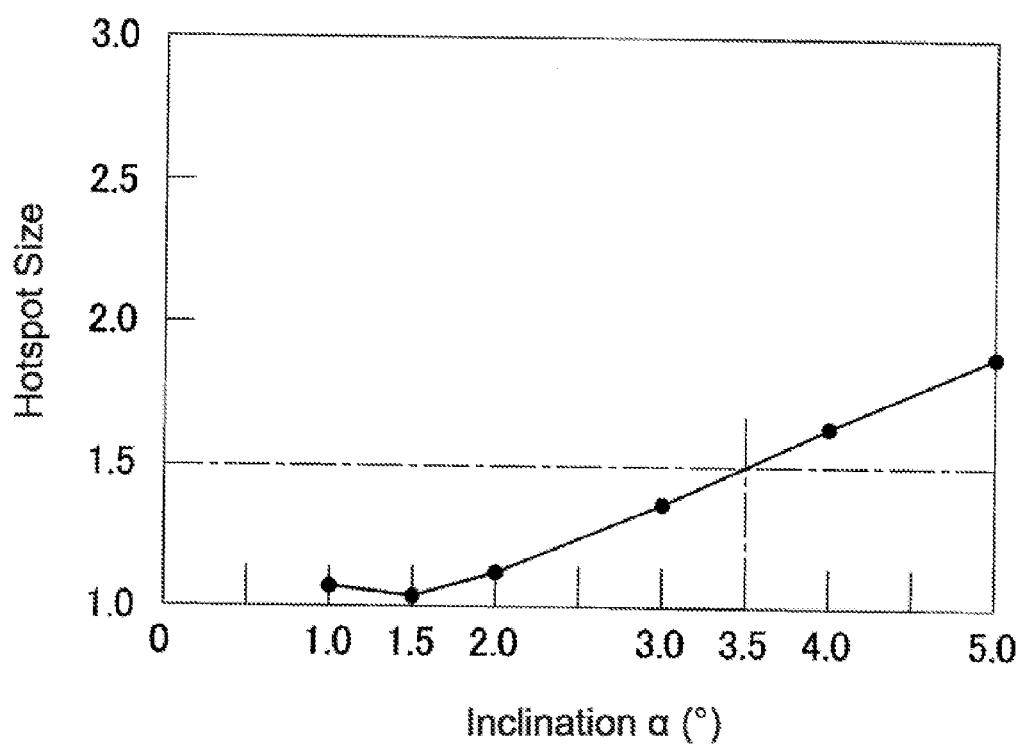
FIG. 11 illustrates the relationship between the inclination of the second slanted surface and a hotspot size.

Next, the range of inclination α of the second slanted surface 37c is described. FIG. 11 illustrates the results of calculating the relationship between the inclination α of the second slanted surface 37c and a hotspot size through simulation. The hotspot size is defined as follows.

The width of a region (referred to below as a test region 46) with the optical axis of the light source 32 as the center when the distance from the light input end surface 38 to the end of the main light guiding body 34 (i.e., the length of the light conducting portion 35) is D, the refractive index of the light guide plate 33 is n, and the light emitting width of the light source 32 (i.e., the widths of the light output window 44) is w, is considered the following.

$$G = 2D \cdot \tan(\arcsin(1/n)) + w \qquad \text{Formula 1}$$

Figure 12:
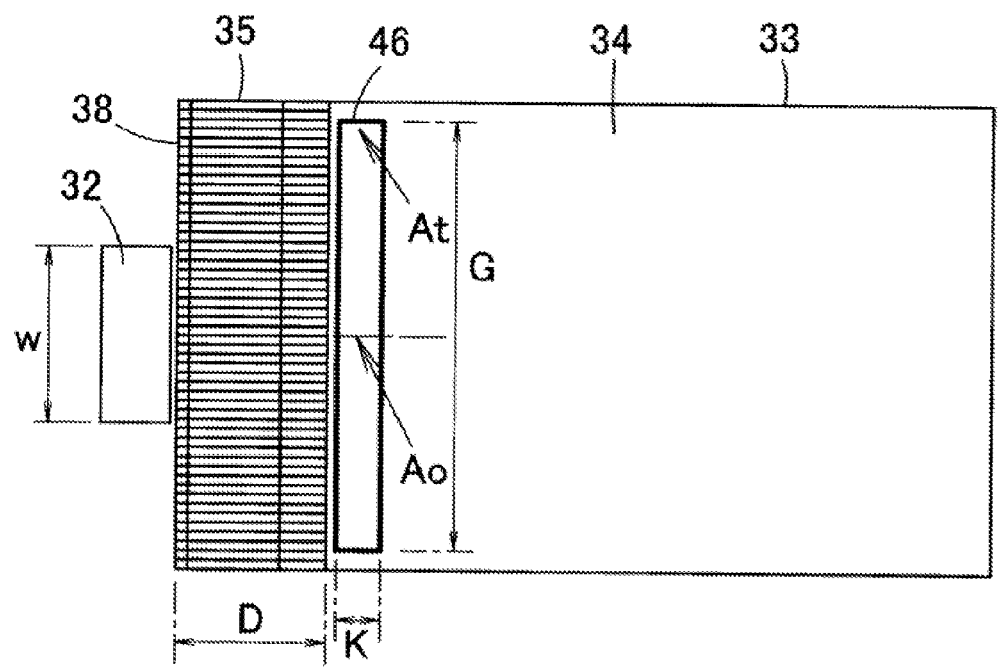
FIG. 12 illustrates the test region for evaluating a hotspot size.

In other words, the end of a test region 46 is a location progressing in the width direction from the end of the light output window of the light source 32 by $D \cdot \tan(\arcsin(1/n))$. However, when a plurality of individual light sources 32 are arranged in a row (e.g., refer to FIG. 26), if the pitch (P) of the light sources 32 is smaller than G defined in the above-mentioned Formula 1 on comparing the value of G calculated from the above-mentioned Formula 1 and the pitch (P) of the light sources 32, the pitch (P) of the light sources 32 is used as the width of the test region 46. The length direction of the test region 46 begins at one end of the main light guiding body 34, and ends a distance K from the end of the main light guiding body 34 in a direction away from the light input end surface 38. The distance K is a constant value no more than 3 mm (e.g., 1 mm). Additionally, the distance D, for instance, is 2.5 mm, the light emitting width w of the light source 32 for instance, is 2 mm, and the refractive index n for instance, is 1.59. Accordingly, the test region 46 is a rectangle (with length K, and width G) longer in the width direction and extending along the end portion of the main light guiding body 34 as illustrated in FIG. 12. With Ao the average luminance at the center of the test region (i.e., in front of the light source 32), and At the average luminance at the end of the test region 46 in the width direction, the hotspot size may be defined as Ao/At. Thus, the uneven luminance decreases as the hotspot size approaches 1, and increases as the hotspot size increases.

According to the results of the simulation depicted in FIG. 11, the hotspot size is closest to the value 1 when the inclination α of the second slanted surface 37c is 1.5°. The hotspot size increases regardless of whether the inclination α is less than or greater than 1.5°. In the surface illumination device (prior art) illustrated in FIG. 5, the hotspot size is no less than 2. However, uneven luminance can be reduced if the hotspot size is no more than 1.5. According to the results in FIG. 11, the inclination α of the second slanted surface 37c needs to be no more than 3.5° to reduce the hotspot size to no more than 1.5. Therefore, it can be understood that the inclination α may be configured to no more than 3.5°.

Additionally, in the first embodiment, the directivity conversion patterns 40a are formed substantially parallel to the second slanted surface 37c; therefore, the uneven luminance may be reduced and the attractiveness of the light emission plane improved as long as inclination of the ridges in the directivity conversion patterns 40a is no more than 3.5°.

While omitted from this description, the simulation implies that the hotspot size approaches the value 1 and thus the uneven luminance in the light guide plate is reduced when the vertical interval (i.e., the distance from the highest position to the lowest position on the second slanted surface 37c in a direction orthogonal to the light output surface 39) is one third the vertical interval between the thickest portion on the outer surface of the light conducting portion 35 and the thinnest portion on the light conducting portion 35. This condition may also be interpreted as setting the height of the second location P2 to no more than one third the height of the first location P1, with the light output surface 39 of the main light guiding body 34 as a reference.

Figure 13:
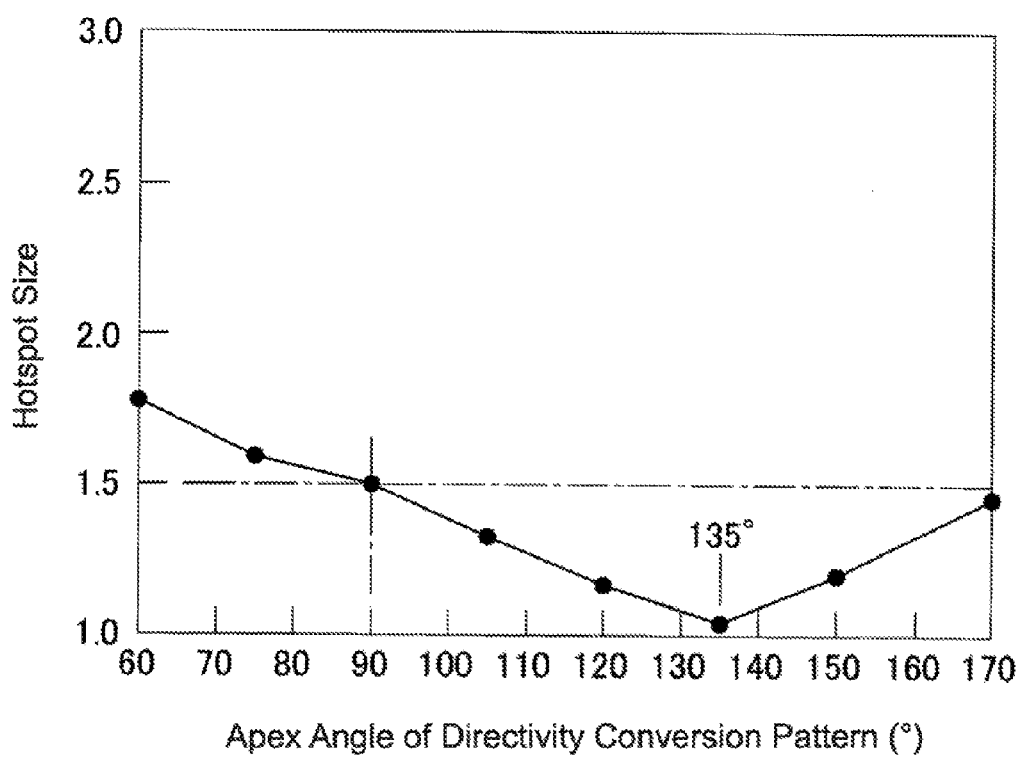
FIG. 13 illustrates the relationship between the apex angle of a directivity conversion pattern and a hotspot size.

Next is described the apex angle formed between adjacent V-shaped grooves in the directivity conversion patterns 40a (referred to below as the apex angle of the directivity conversion patterns 40a). FIG. 13 illustrates the results of calculating a relationship between the apex angle θ of the directivity conversion patterns 40a (refer to FIG. 16) and the hotspot size via simulation. It can be understood from the previous statement and the drawings that the inclined surfaces of adjacent directivity conversion patterns 40a form a ridge therebetween. Looking at a cross section orthogonal to the ridge, the apex angle θ of the directivity conversion patterns 40a then is the angle formed by the inclined surfaces that form the ridge. According to FIG. 13, the hotspot size is closest to the value 1 when the apex angle θ of the directivity conversion patterns 40a is 135°. The hotspot size increases when the apex angle θ is greater or less than 135°. According to FIG. 13, the apex angle θ of the directivity conversion patterns 40a may be configured to between 90° and 170° inclusive to maintain the hotspot size of 1.5.

Figure 14:
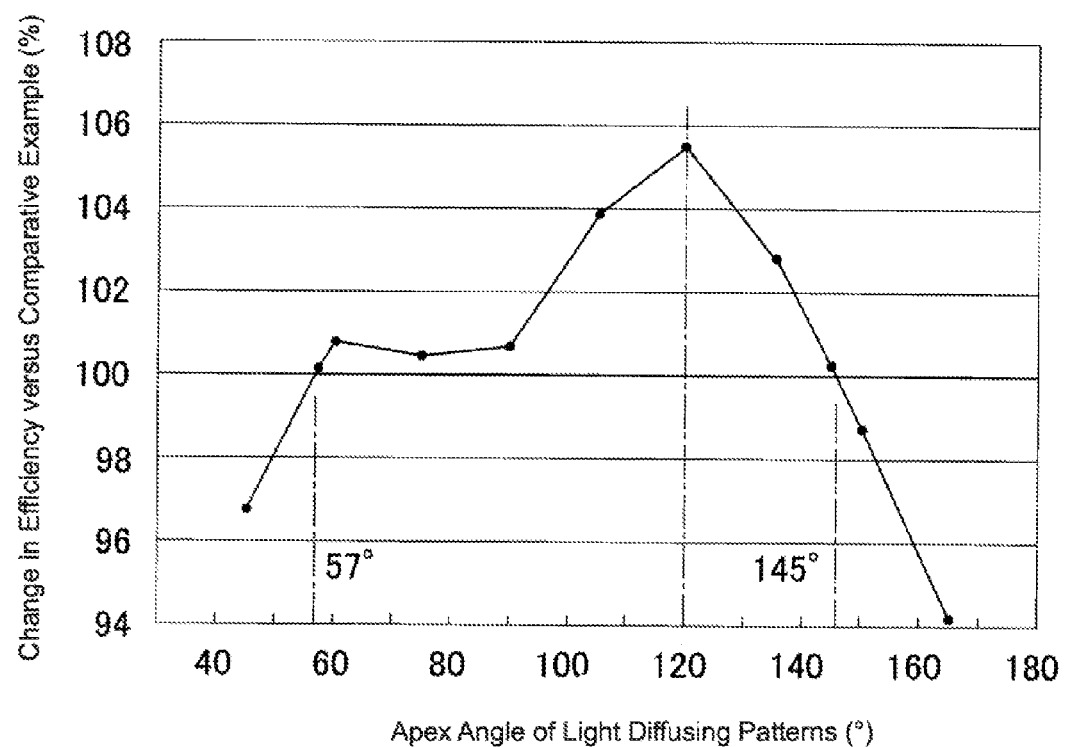
FIG. 14 illustrates the relationship between the apex angle of a light diffusing pattern, and the light guide efficiency when the light guide efficiency of a comparative example is 100%.

FIG. 14 illustrates the relationship between the apex angle ω of light diffusing patterns 40b with V-shaped grooves, and the light guide efficiency. The vertical axis in FIG. 14 represents the light guide efficiency of the light guide plate when the comparative example is taken as 100% (i.e., a light guide plate where symmetrical and identical light diffusing patterns are aligned). Here, the light guide efficiency represents an approximate proportion of the amount of light entering the light conducting portion from the light input end surface and introduced into the main light guiding body therefrom. Furthermore, the apex angle ω of the light diffusing patterns 40b is the apex angle formed by the ridged portion formed between adjacent light diffusing patterns 40b in a cross section orthogonal to the ridges in the light diffusing patterns 40b. As can be understood from FIG. 14, the light guide is most efficient when the apex angle θ is roughly 120°. Additionally, the efficiency improves over the comparative example when the apex angle ω is in the following range.

$$57° \leq \omega \leq 145°$$

As illustrated in FIG. 13, the apex angle θ of the directivity conversion patterns 40a is an optimal value at around 135°; as illustrated in FIG. 14, the apex angle ω of the light diffusing patterns 40b is an optimal value at around 120°. Therefore, the apex angle of the directivity conversion patterns 40a may be equal to or greater than the apex angle of the light diffusing patterns 40b.

Second Embodiment

Figure 15:
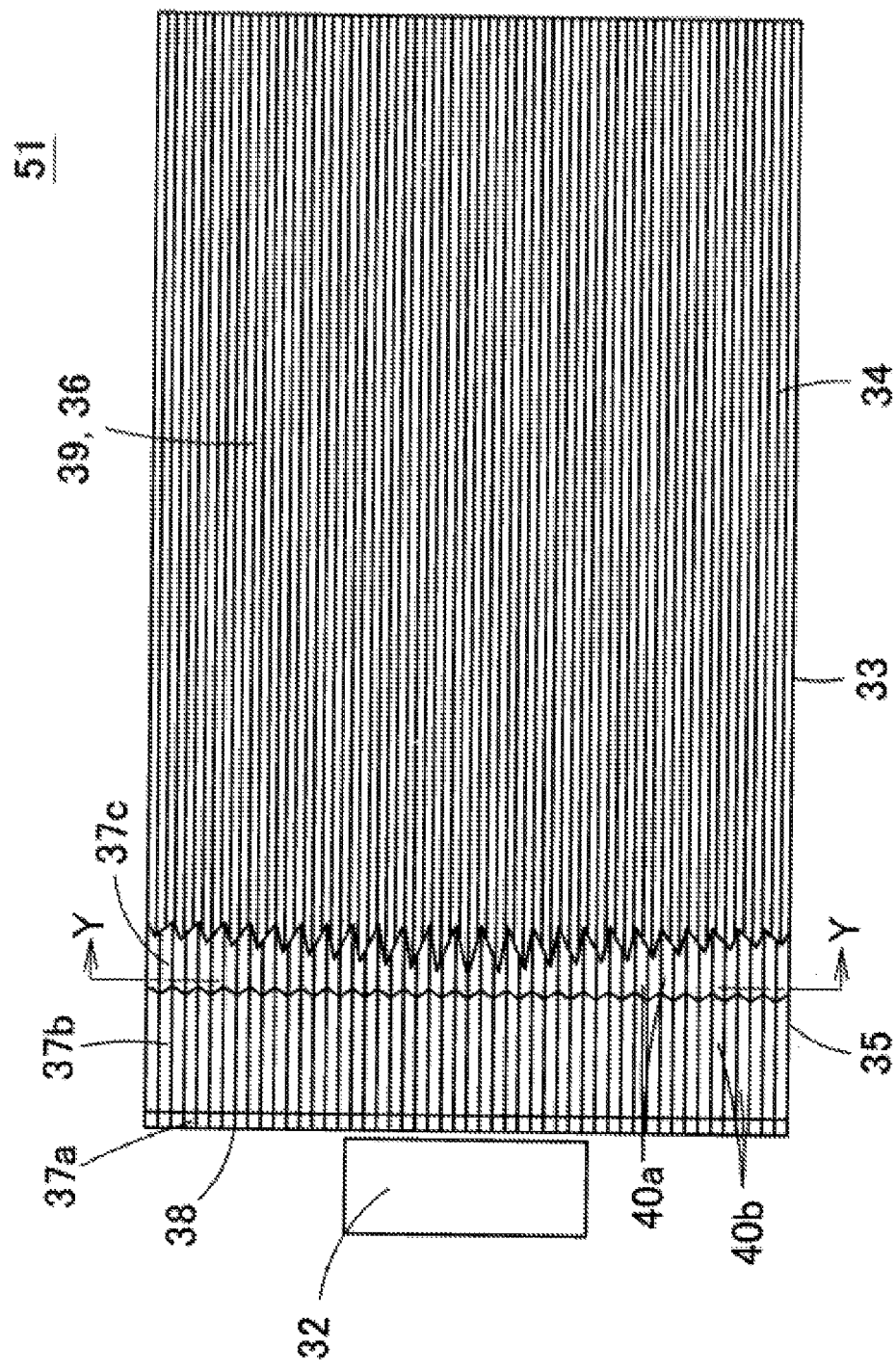
FIG. 15 is a plan view of a surface illumination device according to a second embodiment.

FIG. 15 is a plan view of a surface illumination device 51 according to a second embodiment. One feature of the surface illumination device 51 according to the second embodiment is the cross-sectional shape of the directivity conversion patterns 40a. Namely, a cross section parallel to the light input end surface 38 of the directivity conversion patterns 40a is asymmetrical in the surface illumination device 51 according to the second embodiment. Because the other features of the second embodiment are identical to those in the first embodiment, the portions that are structurally identical are given the same reference numerals and further explanation thereof is omitted.

Figure 16:
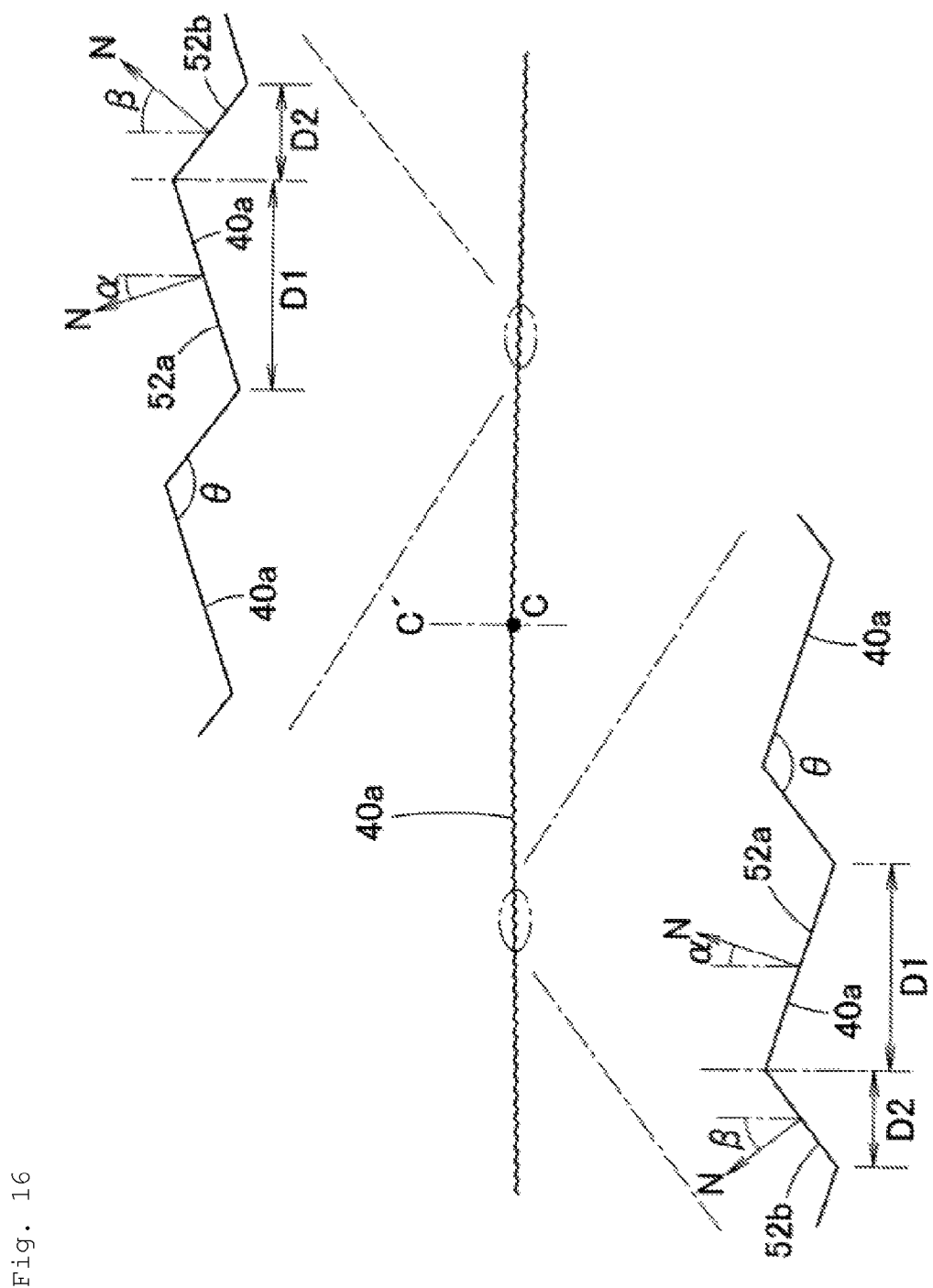
FIG. 16 is a cross-sectional view illustrating a directivity conversion pattern in a cross section parallel to a light input end surface, and an exploded view of a portion thereof.

FIG. 16 is a cross-sectional view illustrating directivity conversion patterns 40a in a cross section parallel to the light incident end surface 38 along the line Y-Y in FIG. 15. FIG. 16 also illustrates an exploded view of a cross section of the directivity conversion patterns 40a. As illustrated in FIG. 16, each of the directivity conversion patterns 40a are configured by two inclined surfaces in a cross section parallel to the light input end surface 38 with different inclinations and inclination directions. The inclined surfaces form asymmetrical V-shaped grooves relative to a straight line orthogonal to the light output surface 39 that pass through the base line (i.e., the lowest point) thereof. Therefore, the second slanted surface 37c contains a plurality of alternately arranged inclined surfaces having different inclination directions.

The cross-sectional shape of the directivity conversion patterns 40a has the following features. Taking a cross section parallel to the light input end surface 38, consider a normal line N rising from the inside to the outside of the light guide plate 33 from an inclined surface in each of the directivity conversion patterns 40a. The normal line N projecting from an inclined surface 52a (referred to below as an inwardly inclined surface 52a) is inclined toward the perpendicular line C' which is orthogonal to the optical axis C. Further, the normal line N projecting from an inclined surface 52b (referred to below as an outwardly inclined surface 52b) is inclined in an opposite direction away from the perpendicular line C'. Here, the total of a transverse width D1 of the inclined surfaces 52a is greater than the total of a transverse width D2 of the inclined surface 52b. However, the total of the transverse width D1 of the inwardly inclined surfaces 52a and the total of the transverse width D2 of the outwardly inclined surfaces 52b are individually calculated for the regions on the left and the right of the optical axis C respectively. Further the respective total of the transverse widths D1 for the inclined surfaces 52a are greater than the total of the transverse widths D2 for the inclined surface 52b on both sides of the optical axis C. In the example illustrated in FIG. 16 in particular, the transverse width D1 of the inwardly inclined surface 52a is greater than the transverse width D2 of outwardly inclined surface 52b for an arbitrary pair of adjacent inclined surfaces 52a, 52b.

Figure 17:
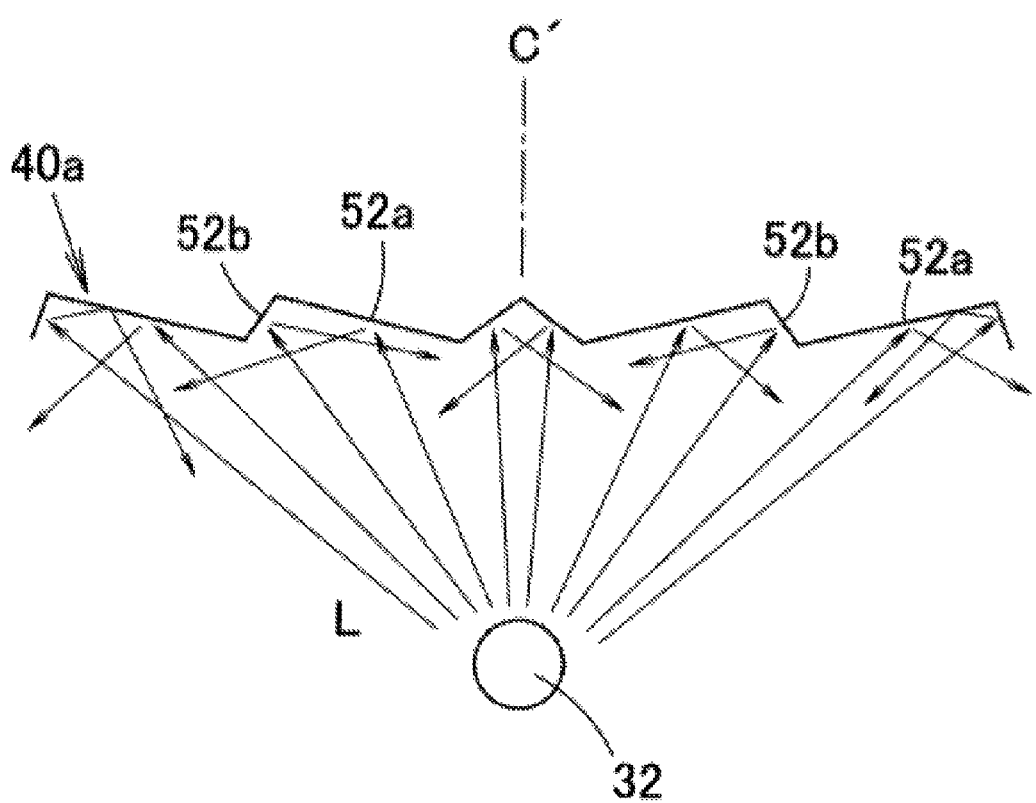
FIG. 17 is a diagram for explaining the effects of the directivity conversion pattern illustrated in FIG. 16.

FIG. 17 is a schematic diagram illustrating the behavior of light reflected by the directivity conversion patterns 40a, and depicts a portion of the directivity conversion patterns 40a in a cross section parallel to the light input end surface 38. The light L incident on the directivity conversion patterns 40a is reflected by the directivity conversion patterns 40a to form a large angle with the optical axis C increasing the spreading thereof in the width direction of the light guide plate 33. As illustrated in FIG. 17, because the inclined surface 52b on which the light L is incident from a nearly orthogonal direction has a small surface area, when light travels from the light source 32 toward the directivity conversion patterns 40a and is incident thereon, the amount of light that may leak from the inclined surface 52b is reduced.

Moreover, the light L exiting from the light source 32 and incident on the inclined surface 52a reflects outward and forms a larger angle with the optical axis; however, because the inclined surface 52a in the directivity conversion patterns 40a has a larger surface area, the amount of light reflected outward increases, broadening the directivity of the light L in the width direction of the light guide plate 33. A portion of the light output toward the center of the light guide plate 33 (in front of the light source 32) is guided toward both end portions of the light guide plate 33 due to reflecting from the directivity conversion patterns 40a; whereas, a portion of the light output toward both ends portions of the light guide plate 33 are reflected at the side surfaces of the light guide plate 33 and guided toward the center thereof, efficiently combining the light and preventing uneven luminance between the center and both end portions of the light guide plate 33.

Figure 18:
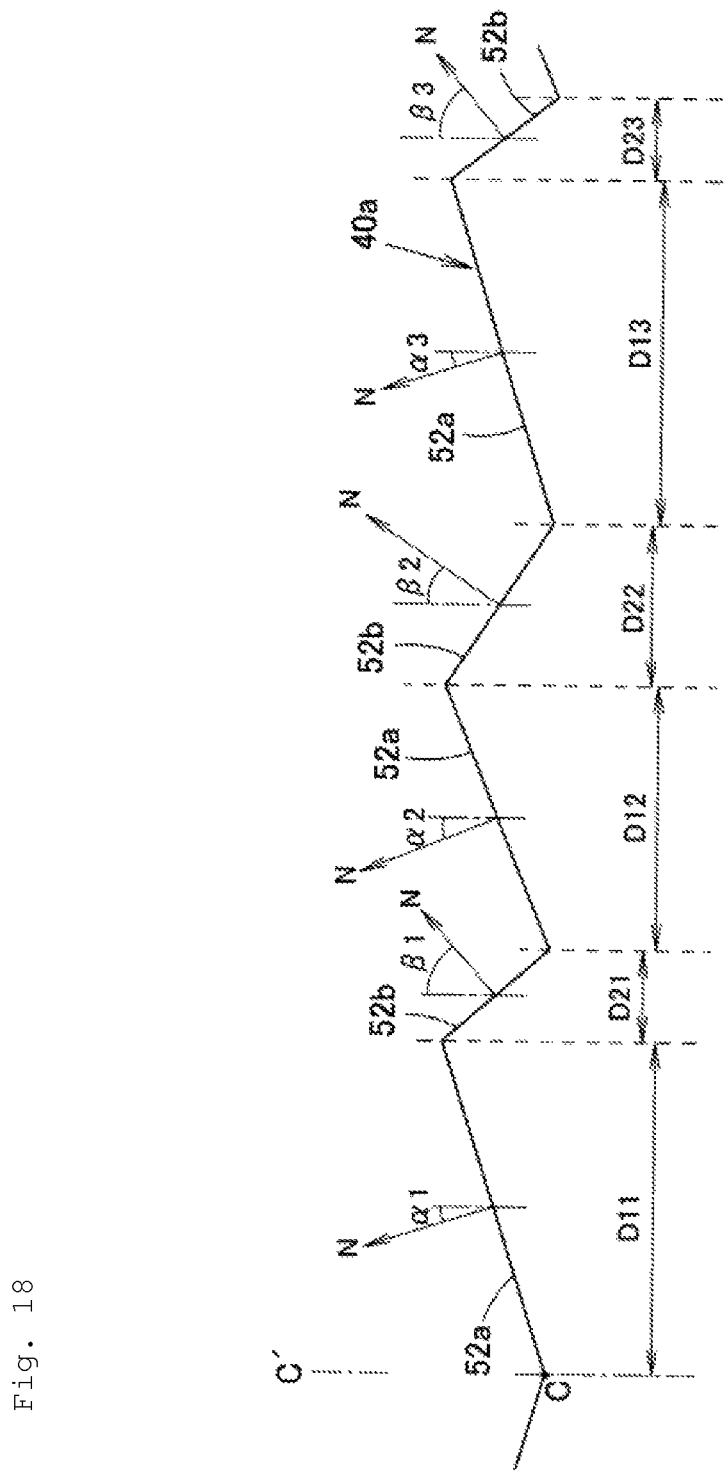
FIG. 18 is a diagram for explaining how the total of the transverse widths and the average angles between outwardly inclined surfaces and inwardly inclined surfaces are calculated.

The cross-sectional shape of the directivity conversion pattern 40a may be expressed as follows. Consider an angle formed between the normal line N projecting from the outwardly inclined surface 52b and the perpendicular line C' (or the inclination of the inclined surface 52b) is an angle $\beta$, and an angle formed between the normal line N projecting from the inwardly inclined surface 52a and the perpendicular line C' (or the inclination of the inclined surface 52a) is an angle $\alpha$. The average angle of the angle $\beta$ is greater than the average angle of the angle $\alpha$. Here, when each of the angles formed between the normal line N projecting from the inwardly inclined surface 52a is $\alpha i$, and the transverse width of each of the inclined surfaces 52a is D1$i$ respectively (where "i" is an index assigned to each inwardly inclined surface 52a) as depicted in FIG. 18, the average angle of the angle $\alpha$ formed between the normal line N projecting from the inwardly inclined surface 52a and the perpendicular line C' is defined by the following formula.

$\Sigma \alpha i \times D1i / \Sigma D1i$

Here, the summation for the numerator and denominator are both calculated for the inclined surfaces 52a in the region on the right and on the left of the optical axis C. Similarly, when each of the angles formed between the normal line N projecting from the outwardly inclined surface 52b is $\beta j$, and the transverse width of each of the inclined surfaces 52b is D2$j$ respectively (where "j" is an index assigned to each outwardly inclined surface 52b) the average angle of the angle $\beta$ formed between the normal line N projecting from the outwardly inclined surface 52b and the perpendicular line C' is defined by the following formula.

$\Sigma \beta j \times D2j / \Sigma D2j$

Here, the summation for the numerator and denominator are both calculated for the inclined surfaces 52b in the region on the right and on the left of the optical axis C. Additionally, the sizes of the average angles are compared individually for the region on the right and the region on the left of the optical axis C. In the example illustrated in FIG. 18 in particular, the angle $\beta$ formed between the normal line N projecting from the outwardly inclined surface 52b and the perpendicular line C' is greater than the angle formed between the normal line N projecting from the inwardly inclined surface 52a and the perpendicular line C' for an arbitrary pair of adjacent inclined surfaces 52a, 52b.

Figures 22A, 22B:
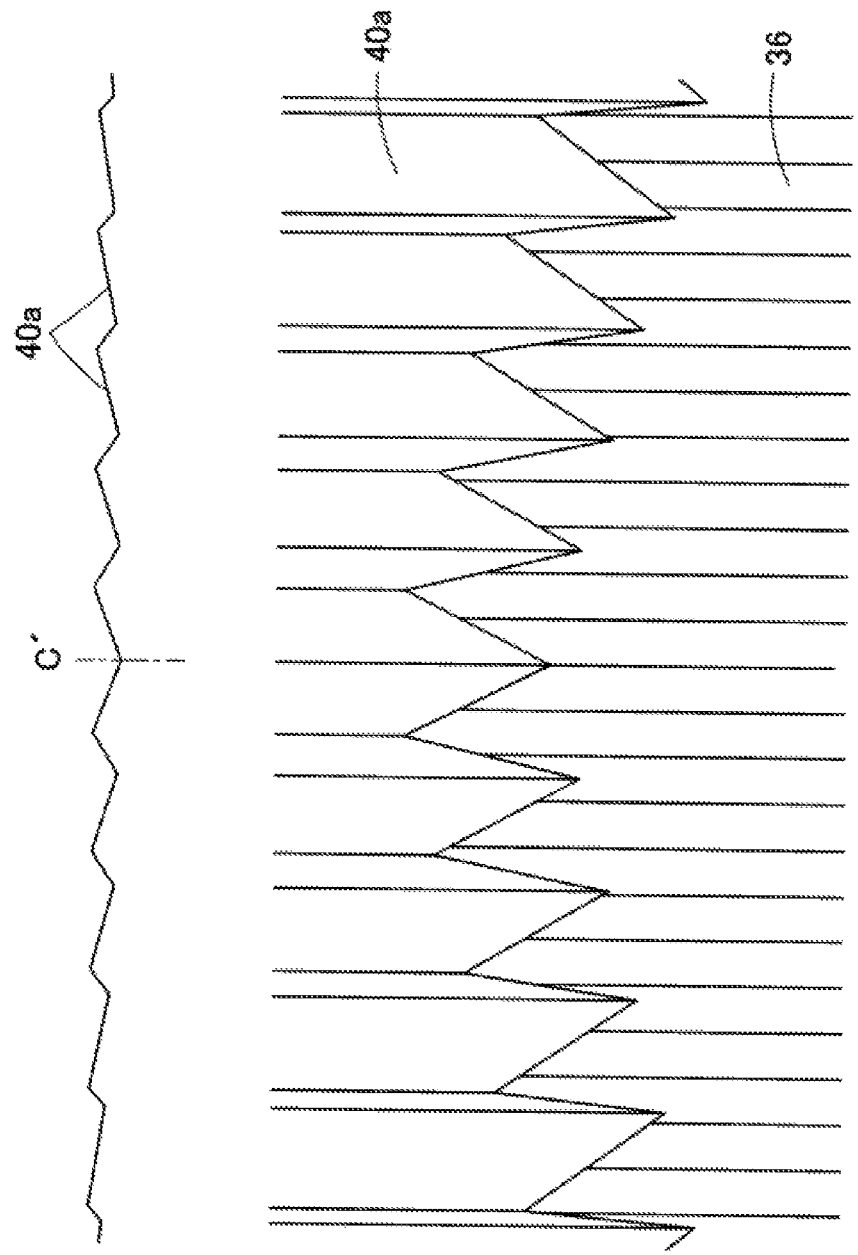
FIG. 22A is a cross-sectional view illustrating directivity conversion patterns that are gradually rotated as the patterns are lined up next to each other.
FIG. 22B is a plan view illustrating the interface between the directivity conversion patterns and the lenticular lens in FIG. 22A.

The directivity conversion patterns 40a may not only have an asymmetrical cross-sectional shape, but may also have a cross-sectional shape that varies from the center outward along the width direction. As illustrated in FIG. 19 in particular, according to one or more embodiments of the present invention, the width of the inwardly inclined surface 52a gradually increases with increased distance from the optical axis C, while the width of the outwardly inclined surface 52b gradually decreases. For instance, as illustrated in FIG. 22A, the apex angle of the directivity conversion patterns 40a is kept constant as the directivity conversion patterns 40a gradually rotates. The end portions of the directivity conversion patterns 40a and the end portions of the lenticular lens 36 connect uninterruptedly to intersect with each other at the boundaries of the second slanted surface 37c and the light output surface 39.

Figure 20A:
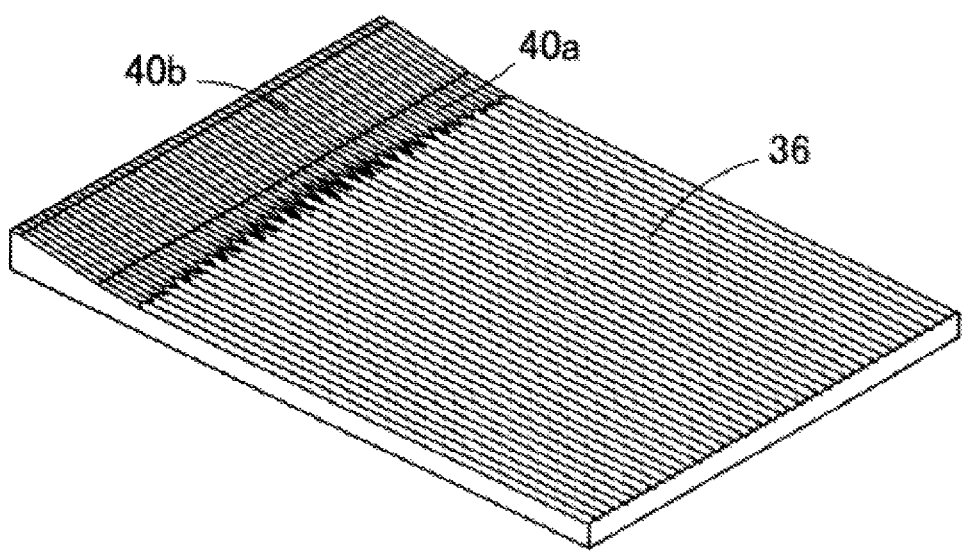
FIG. 20A is a perspective view of the light guide plate used in the surface illumination device illustrated in FIG. 15.
Figure 20B:
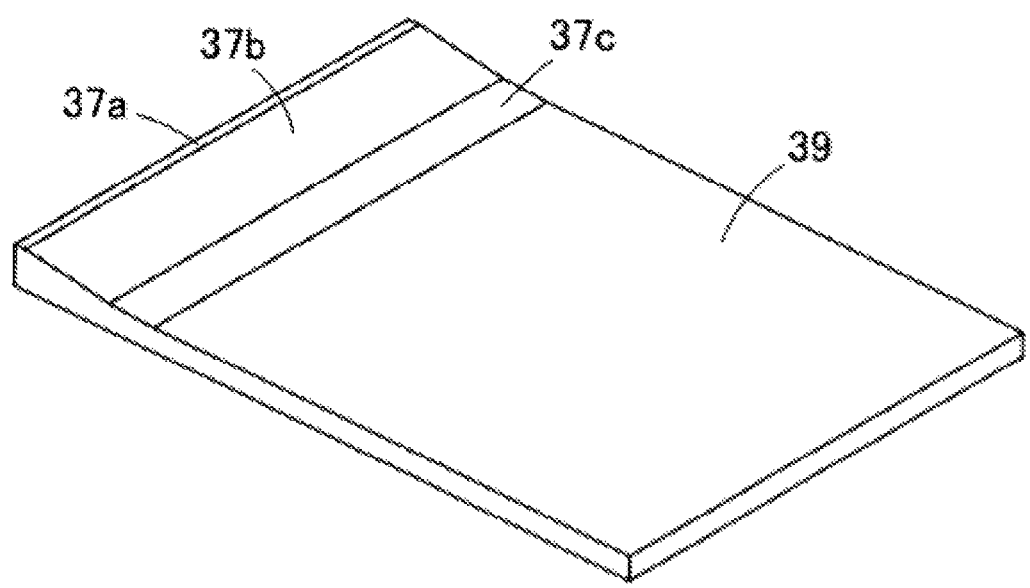
FIG. 20B is a perspective view illustrating when each type of optical pattern is removed from the light guide plate in FIG. 20A.

When the directivity conversion patterns 40a are configured with such a form, a portion of the directivity conversion patterns 40a appear largely sunken in at the center of the light guide plate 33 as illustrated in FIG. 20A, even if the second slanted surface 37c is uniform along the width direction of the light guide plate 33 as illustrated in FIG. 20B. The appearance of the directivity conversion patterns 40a results from the end portions of the lenticular lens 36 extending largely toward the second slanted surface 37c because more of the lenticular lens 36 protrude above the outer surface of the directivity conversion patterns 40a as illustrated in FIG. 19.

FIGS. 21A and 21B and FIGS. 22A and 22B illustrate how the shape of the boundary portion between the directivity conversion patterns 40a and the lenticular lens 36 changes in cases where the widths of the inclined surface 52a and the inclined surface 52b in the directivity conversion patterns 40a are uniform, and where the widths of the inclined surface 52a and the inclined surface 52b gradually change.

Figures 21A, 21B:
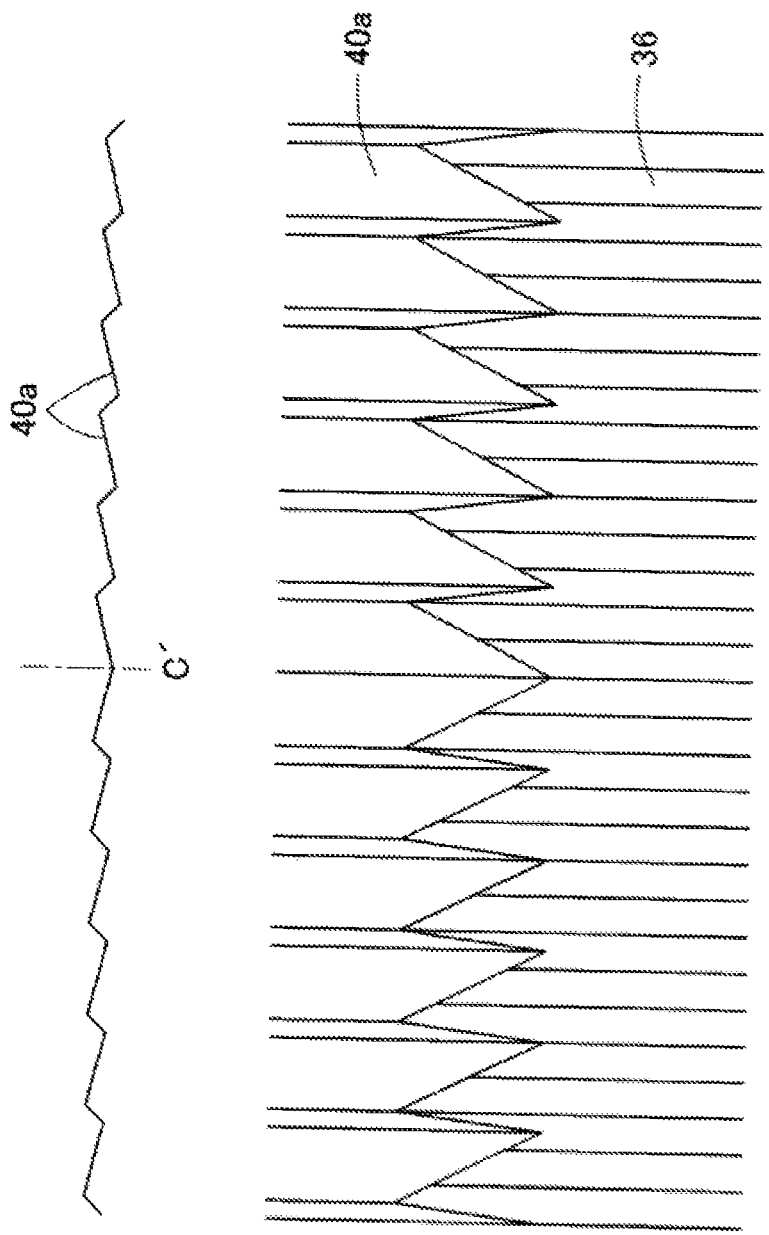
FIG. 21A is a cross-sectional view of lining up directivity conversion patterns having the same cross-sectional shape.
FIG. 21B is a plan view illustrating the interface between the directivity conversion patterns and the lenticular lens in FIG. 21A.

FIG. 21A illustrates a case where a plurality of identically-shaped directivity conversion patterns 40a with asymmetrical cross sections is repeatedly arranged next to each other. In this case, the boundary portion between the directivity conversion patterns 40a and the lenticular lens 36 is, overall, lined up substantially parallel to the light input end surface 38 even with valleys and ridges in that portion. That is, the overall protruding length of the lenticular lens 36 toward the directivity conversion patterns 40a is substantially constant across the width direction of the light guide plate.

In contrast, FIG. 22A illustrates the case where the apex angles of adjacent directivity conversion patterns 40a are kept constant and the cross-sectional shape thereof rotated while aligning the plurality of directivity conversion patterns 40a. Note that this is a special case for the directivity conversion patterns 40a having the cross sections illustrated in FIG. 18. Here, as illustrated in FIG. 22B, overall, the boundary portion between the directivity conversion patterns 40a and the lenticular lens 36 gradually shifts further away from the light input end surface 38 in accordance with a distance from the optical axis C outward in the width direction of the light guide plate 33. That is, the trend is for the protruding length of the lenticular lens 36 towards the directivity conversion patterns 40a to increase in accordance with approaching the optical axis C.

Figure 23:
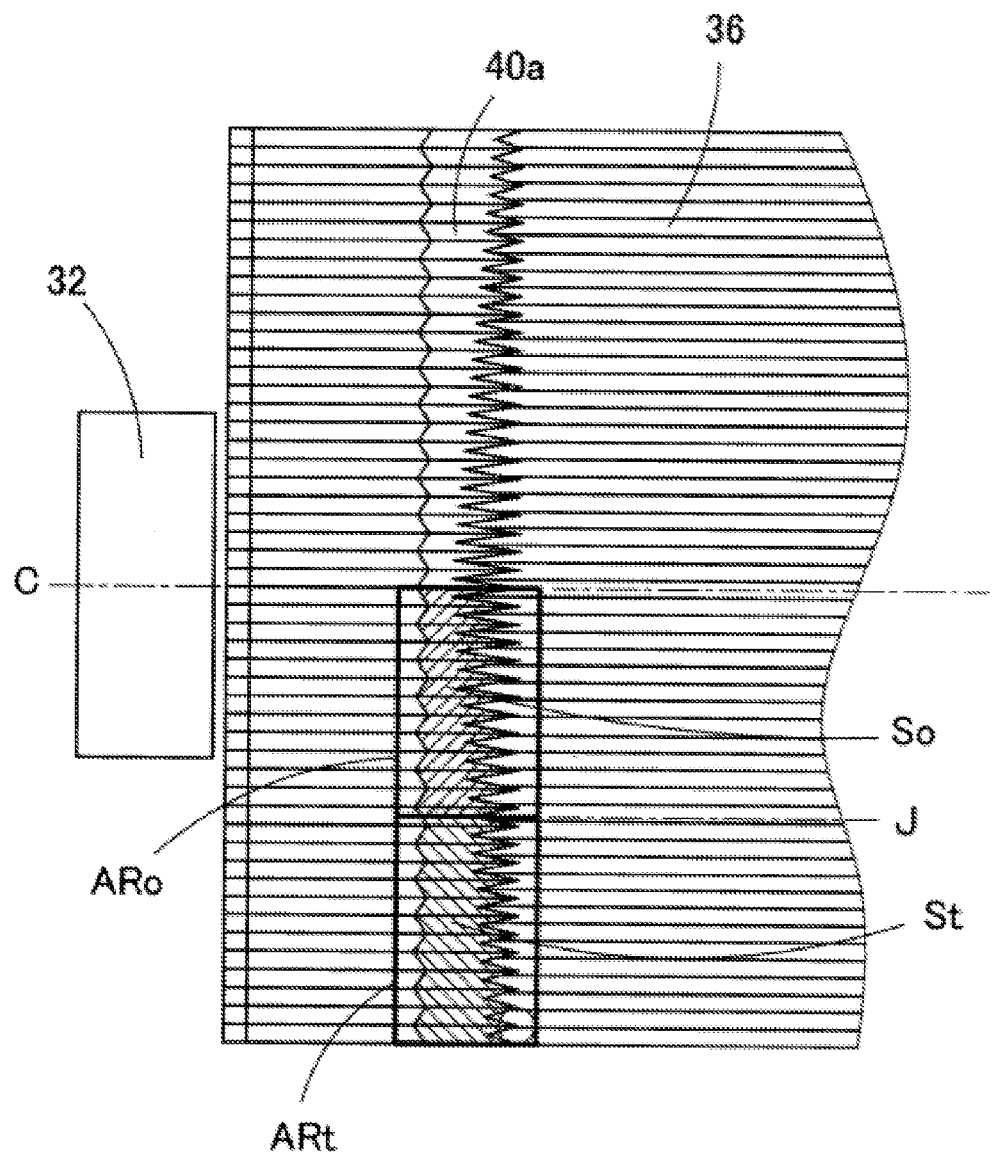
FIG. 23 illustrates the total surface area of the directivity conversion patterns included in the region near the light source, and the total surface area of the directivity conversion patterns included in the region near the side surfaces.

The features of the boundary portion between the directivity conversion patterns 40a and lenticular lens 36 described with reference to FIGS. 21A and 21B, and FIGS. 22A and 22B can be quantitatively managed when expressed in the following manner. As illustrated in FIG. 23, the light guide plate 33 is divided into left and right regions with the optical axis C of the light source 32 serving as a border. In each the left and the right regions, the area between the optical axis C and the side surface of the light guide plate 33 is further divided into two sub regions by a dividing line J that is parallel to the optical axis C and equidistant from the optical axis C and the side surface of the light guide plate 33.

Thus, an overall surface area (total surface area, So) may be calculated for the directivity conversion patterns 40a contained in a region ARo which is a region between the optical axis C and the dividing line J and includes the second slanted surface 37c. Similarly, the overall surface area (total surface area, St) may be calculated for the directivity conversion patterns 40a contained in the region ARt which is a region between the dividing line J and the side surface of the light guide plate 33 including the second slanted surface 37c. In the case of the directivity conversion patterns 40a configured as illustrated in FIGS. 22A and 22B, the surface area ARo calculated in this manner is smaller than the surface area ARt. Configuring the directivity conversion patterns to satisfy this condition favorably reduces the amount of light that may leak from the directivity conversion patterns 40a and increases the effectiveness of making the luminance in the light guide plate more uniform. In contrast, with the directivity conversion patterns 40a configured as illustrated in FIGS. 21A and 21B, the surface area ARo is substantially equal to the surface area ARt.

Figure 24A:
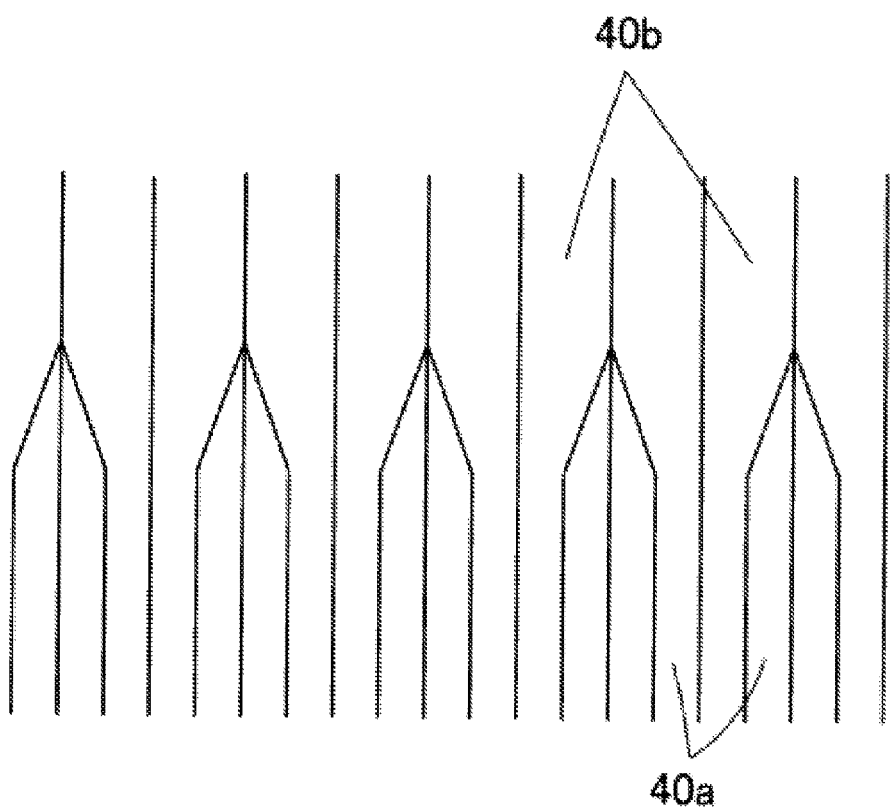
FIG. 24A and FIG. 24B are plan views for describing the relationship between the pitches of the directivity conversion patterns and the light diffusing patterns.
Figure 24B:
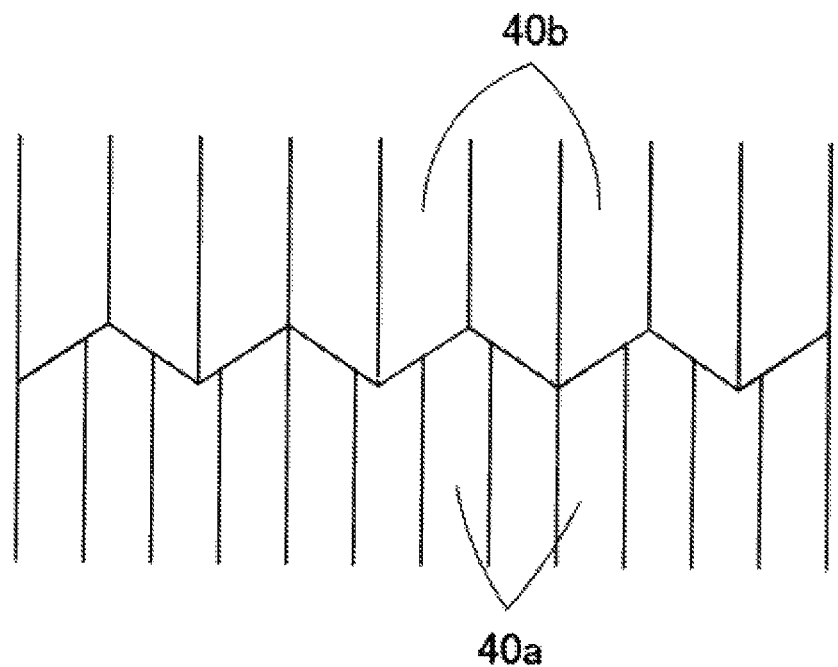

In one or more of the above-mentioned embodiments, the pitch at which directivity conversion patterns 40a are arranged, and the pitch at which the light diffusing patterns 40b are arranged are equal, with the ridges from both patterns 40a, 40b arranged in a straight line. Without being limited to this configuration, the pitch of the directivity conversion patterns 40a may be half the pitch of the light diffusing patterns 40b as illustrated in FIG. 24A. In the example illustrated, every other directivity conversion pattern 40a is formed to connect a light diffusing pattern 40b and a ridge, with the directivity conversion patterns 40a therebetween formed to enter between the tip ends of the light diffusing patterns 40b. As further illustrated in FIG. 24A, the pitch of the directivity conversion patterns 40a may differ from the pitch of the light diffusing patterns 40b and for a certain number of elements arranged, the ridge of a directivity conversion pattern 40a and the ridge of the light diffusing pattern 40b may form a straight line.

Note that, in the second embodiment as well, the apex angle of the directivity conversion patterns 40a may be 90° to 170° inclusive. According to one or more embodiments of the present invention, the apex angle of the directivity conversion patterns 40a is greater than or equal to the apex angle of the light diffusing patterns 40b. The light diffusing patterns 40b may also be asymmetrical with a gradually varying cross-sectional shape similarly to the directivity conversion patterns 40a in the second embodiment.

Third Embodiment

Figure 25:
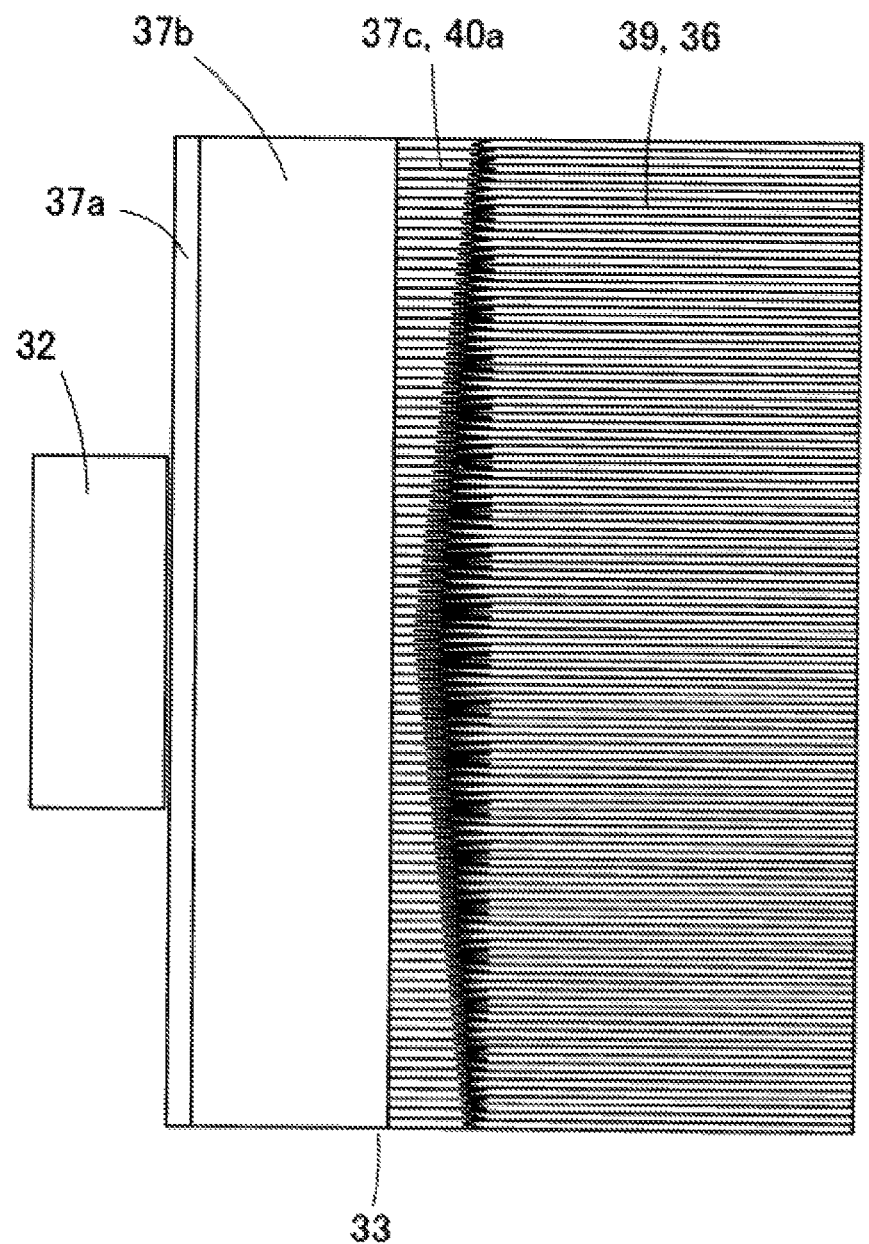
FIG. 25 is a plan view of a surface illumination device according to a third embodiment.

FIG. 25 is a plan view of a surface illumination device according to a third embodiment. In the third embodiment, no light diffusing patterns 40b are provided on the horizontal surface 37a or the first slanted surface 37b.

Fourth Embodiment

Figure 26:
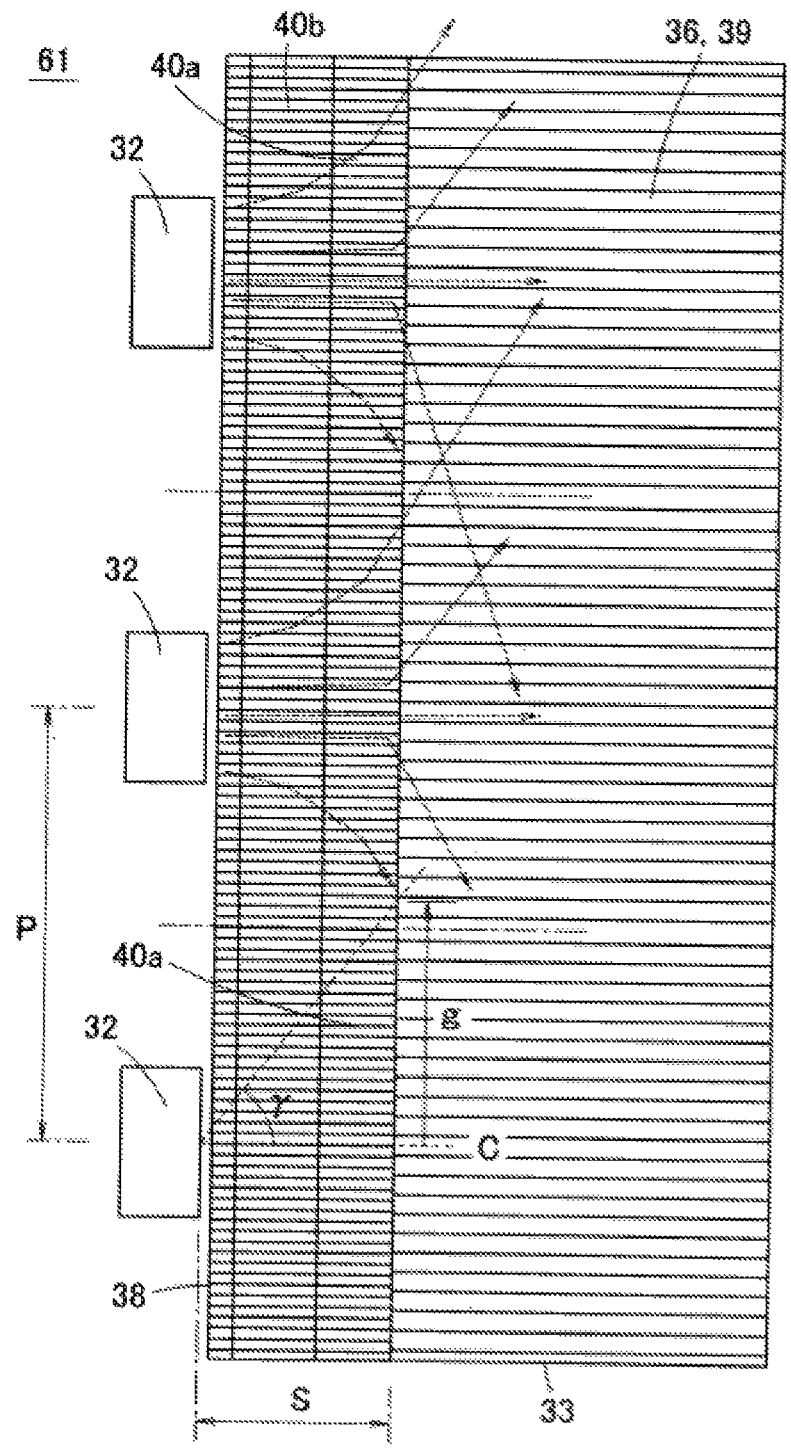
FIG. 26 is a plan view of a surface illumination device provided with a plurality of individual light sources according to a fourth embodiment.

Next, a surface illumination device 61 is described which includes a plurality of light sources 32. FIG. 26 is a plan view of the surface illumination device 61 provided with a plurality of light sources 32 arranged facing the light input end surface 38 of the light guide plate 33. The light sources 32 are arranged at a pitch P in the surface illumination device 61.

When a plurality of individual light sources 32 is arranged as exemplified in the fourth embodiment, the light diffusing patterns 40b and the directivity conversion patterns 40a cause the light from the light sources 32 to spread as illustrated in FIG. 26. As a result, light from a light source 32 adjacent to a given light source may be guided to a light guide plate region corresponding to the given light source 32, thus eliminating insufficient light between a light source 32, and the adjacent light source 32.

When a plurality of light sources 32 are aligned however, the directivity conversion patterns 40a in the middle of adjacent light sources 32 is exposed to light from the light sources 32 on both sides. When light from the light sources 23 on both sides strikes certain locations on the directivity conversion patterns 40a simultaneously, the light use efficiency of the surface illumination device tends to deteriorate because it is difficult to optimize the design of the directivity conversion patterns 40a for discouraging light leakage of the light entering the directivity conversion patterns 40a from both sides.

Accordingly, according to one or more embodiments of the present invention, the directivity conversion patterns 40a are configured so that light from a plurality of light sources 32 is not incident thereon. The incidence angle γ of light exiting a light source 32 and entering the light conducting portion 35 from the light input end surface 38 is expressed using Fresnel's Law.

$$\gamma = \arcsin(1/n) \quad \text{Formula 2}$$

Here, n is the refractive index of the light guide plate 33. Consequently the spread of light in the light conducting portion 35 ranges from left to right forming an angle γ with the optical axis C as the center as illustrated in FIG. 26. The spreading g of light in horizontal direction in the directivity conversion patterns 40a is derived from FIG. 26 and the above-mentioned Formula 2.

$$g = S \tan \gamma \approx S \cdot \gamma = S \cdot \arcsin(1/n) \quad \text{Formula 3}$$

The transverse spread g may be established as no more than one half the pitch P of the light sources 32 to ensure light guided in a direction along the angle γ formed with the optical axis C does not enter a region adjacent thereto.

$$g \leq P/2 \quad \text{Requirement 1}$$

Note that S is a distance measured from the end surface (light emission plane) of the light source 32 to the end of the directivity conversion patterns 40a. Accordingly, the above-mentioned Formula 3 and Requirement 1 can be used to establish a criteria ensuring that light does not reach the directivity conversion patterns 40a from two directions.

$$S \leq P/(2 \cdot \arcsin(1/n)) \quad \text{Requirement 2}$$

Therefore, when using multiple light sources 32, the distance S measured from the end surface of the light sources 32 to the end of the directivity conversion patterns 40a may be established to satisfy:

$$S \leq P/(2 \cdot \arcsin(1/n))$$

With S established in this manner, it becomes possible to optimize the design of the directivity conversion patterns 40a, thereby reducing light leakage and increasing light use efficiency.

Other Embodiments

Figure 27A:
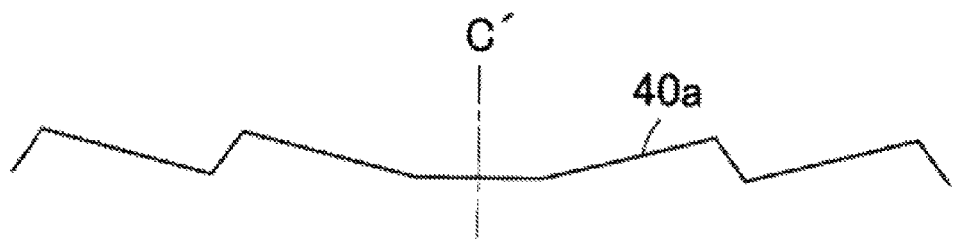
FIG. 27A through FIG. 27E are schematic views illustrating the various cross-sectional shapes of the directivity conversion pattern.
Figure 27B:
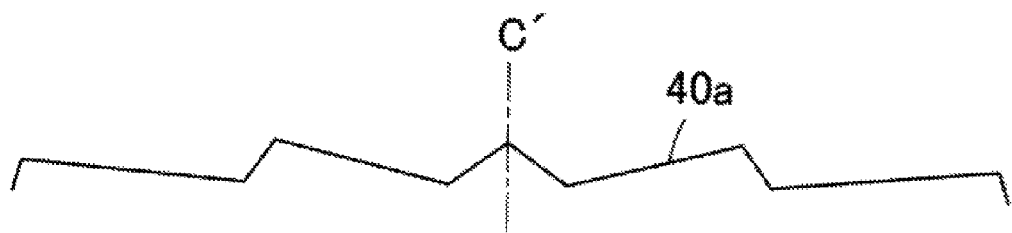
Figure 27C:
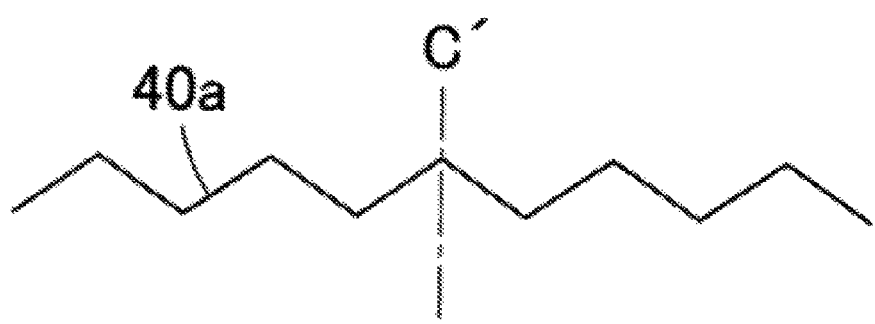
Figure 27D:
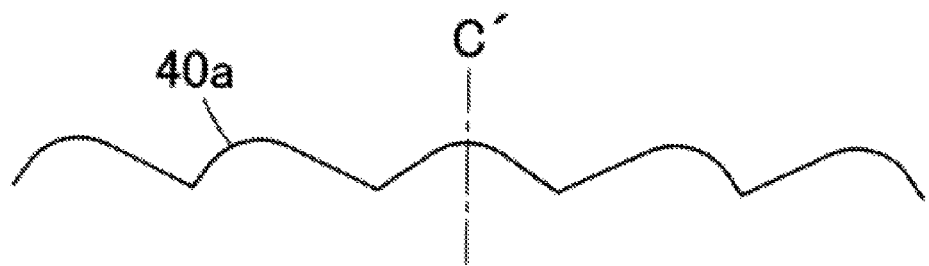
Figure 27E:
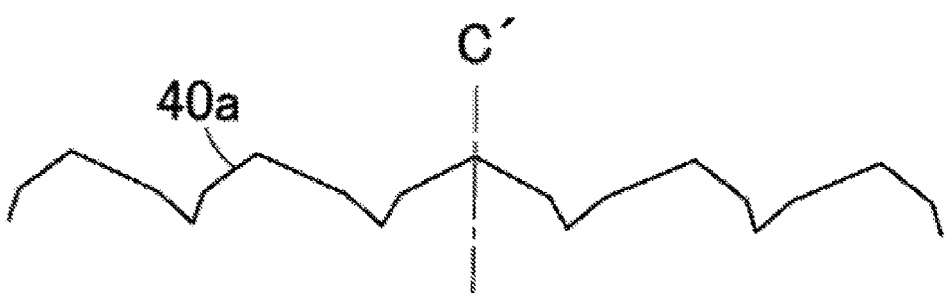

FIG. 27A through FIG. 27E illustrate various cross-sectional shapes for the directivity conversion patterns 40a. In FIG. 27A directivity conversion patterns 40a with asymmetrical cross-sectional shapes are repeatedly lined up next to each other in the left and the right regions. In FIG. 27B directivity conversion patterns 40a with asymmetrical cross-sectional shapes are arranged gradually changing in the left and the right regions. More specifically, the directivity conversion patterns 40*a* are gradually rotated about the ridges while the apex angle thereof is kept constant. As illustrated in FIG. 27C, directivity conversion patterns 40*a*, which are symmetrical V-shaped grooves, may be repeatedly lined up next to each other. As illustrated in FIG. 27D the apex portion of the directivity conversion patterns 40*a* may be curved, and as illustrated in FIG. 27E, directivity conversion patterns 40*a* with polygonal cross-sectional shapes may be arranged.

Figure 28A:
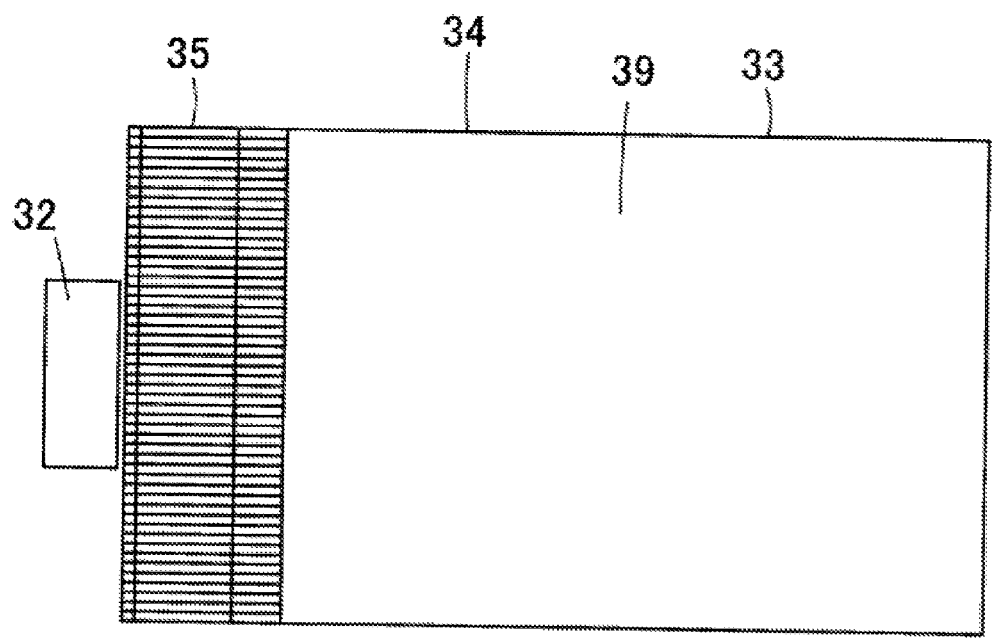
FIG. 28A and FIG. 28B are diagrams for describing different ways of processing the light output surface.
Figure 28B:
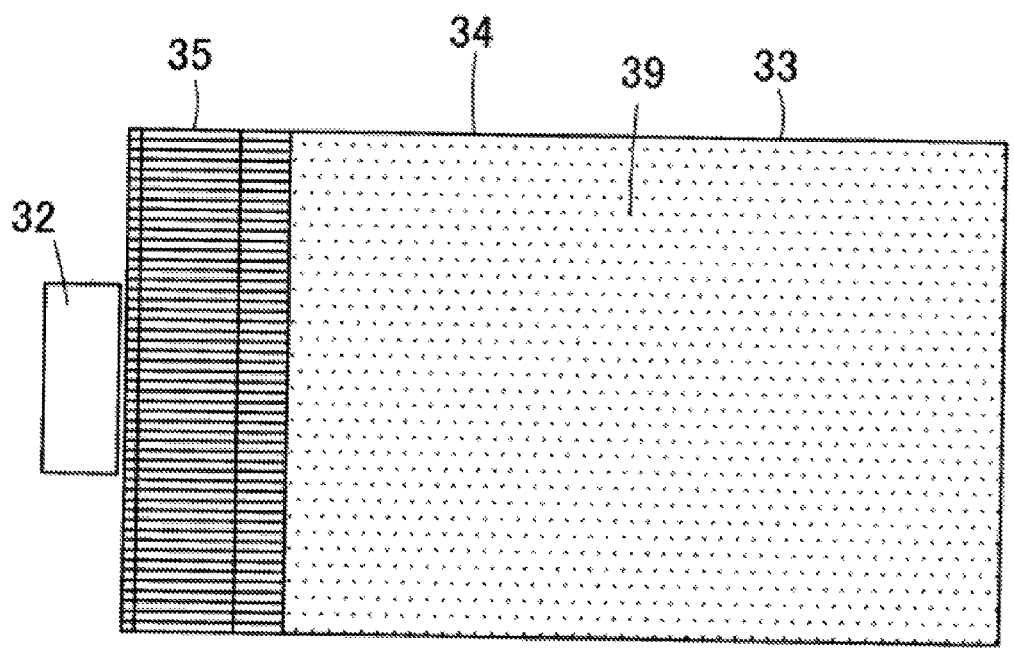

FIGS. 28A and 28B illustrate various optical patterns that may be provided on the light output surface 39. The light output surface 39 in one or more of the above embodiments has been provided with lenticular lens 36. However, as evident in FIG. 28A, the light output surface 39 may be provided with a mirror surface or substantially mirrored surface. The light output surface 39 may also be coarsely polished to be provided with a rough surface as illustrated in FIG. 28B. Alternatively, the light output surface 39 may be ground to impart fine scratches thereon along the length direction thereof. Although these are scratches, the scratches provide the same effect as the lenticular lens.

Figure 29:
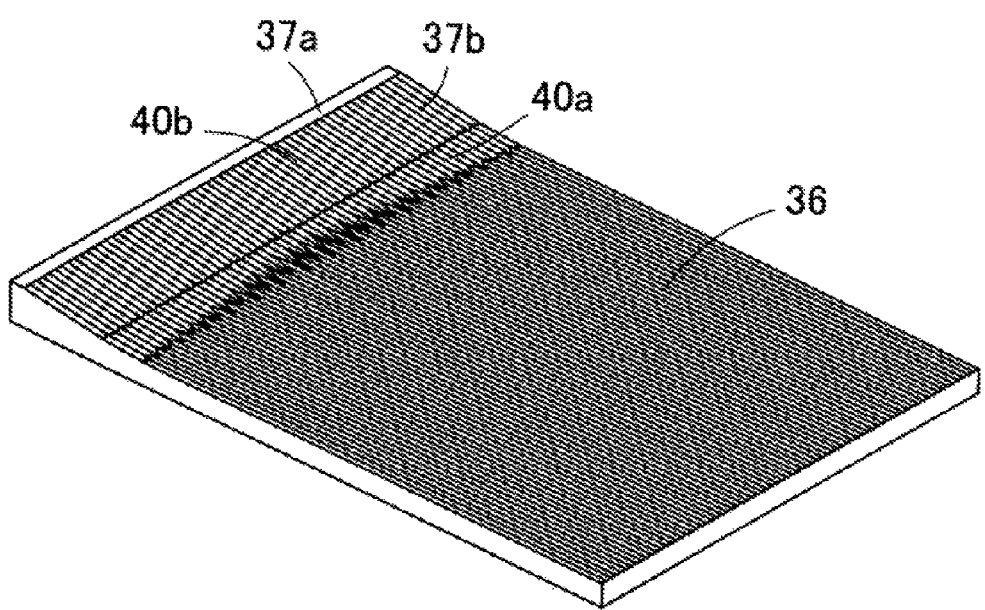
FIG. 29 is a perspective view illustrating a different form of the light guide plate.

In FIG. 29 the light diffusing patterns 40*b* are only provided on the first slanted surface 37*b* while the horizontal surface 37*a* is smooth with no light diffusing patterns 40*b* thereon.

Figure 30A:
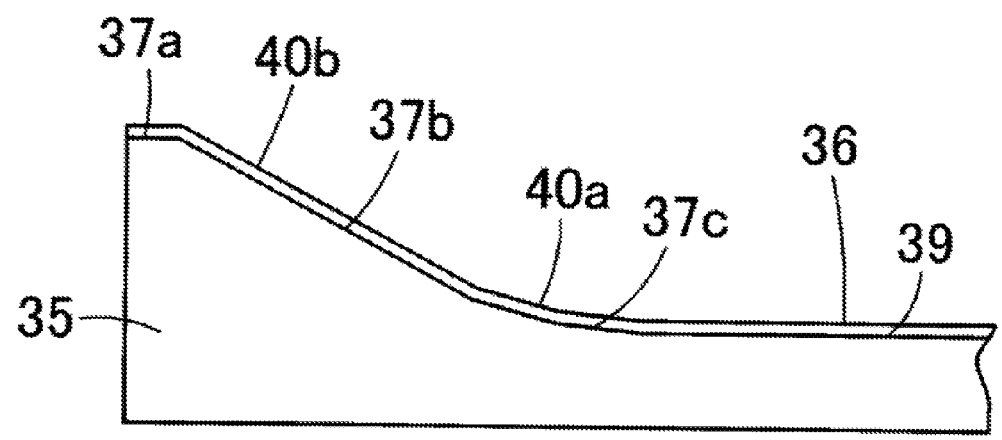
FIG. 30A through FIG. 30C are schematic diagrams of various modifications to the light conducting portion.
Figure 30B:
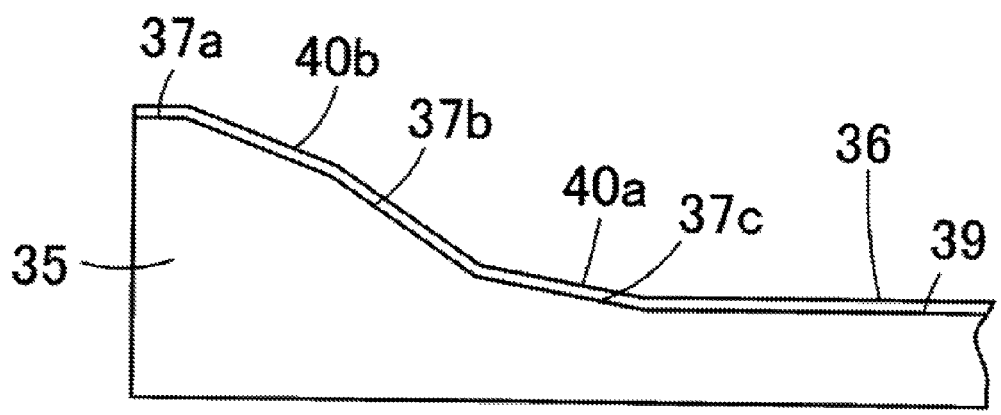
Figure 30C:
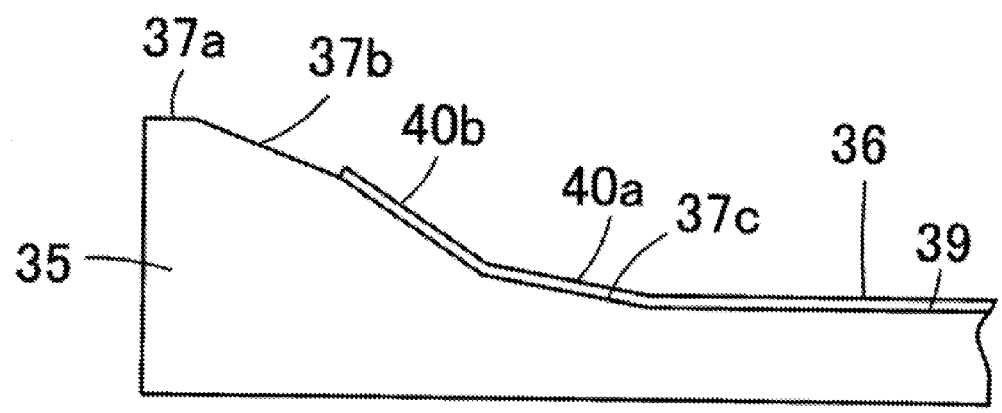

FIG. 30A illustrates a light guide plate where the second slanted surface 37*c* is configured from a plurality of regions with different inclinations. In the example, the second slanted surface 37*c* is bent into the shape of the letter V. FIG. 30B illustrates a light guide plate where the first slanted surface 37*b* is configured from a plurality of regions with different inclinations. In the example, the first slanted surface 37*b* is bent into the shape of the letter V. FIG. 30C illustrates a light guide plate where light diffusing patterns 40*b* are provided on only a portion of the first slanted surface 37*b*. In the example the horizontal surface 37*a* and a portion of the first slanted surface 37*b* are smooth surfaces carrying no patterns.

Figure 31A:
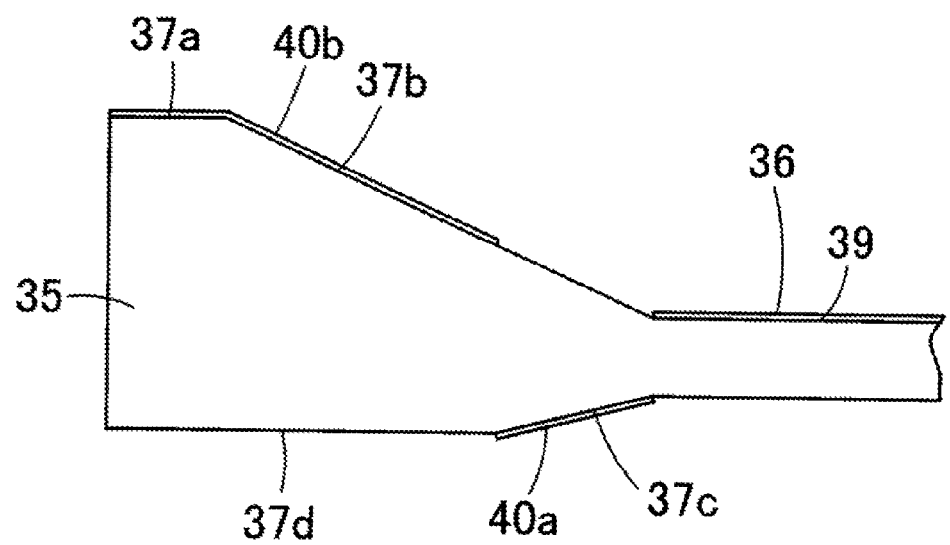
FIG. 31A through FIG. 31C are schematic diagrams of different modifications to the light conducting portion.

In FIG. 31A the first slanted surface 37*b* and the light diffusing patterns 40*b* are provided on the upper surface of the light conducting portion 35, and the second slanted surface 37*c* and the directivity conversion patterns 40*a* are provided on the lower surface of the light conducting portion 35. A horizontal surface 37*d*, which is longer than the horizontal surface 37*a*, is also provided at the end portion of the light conducting portion 35 on the lower surface thereof.

Figure 31B:
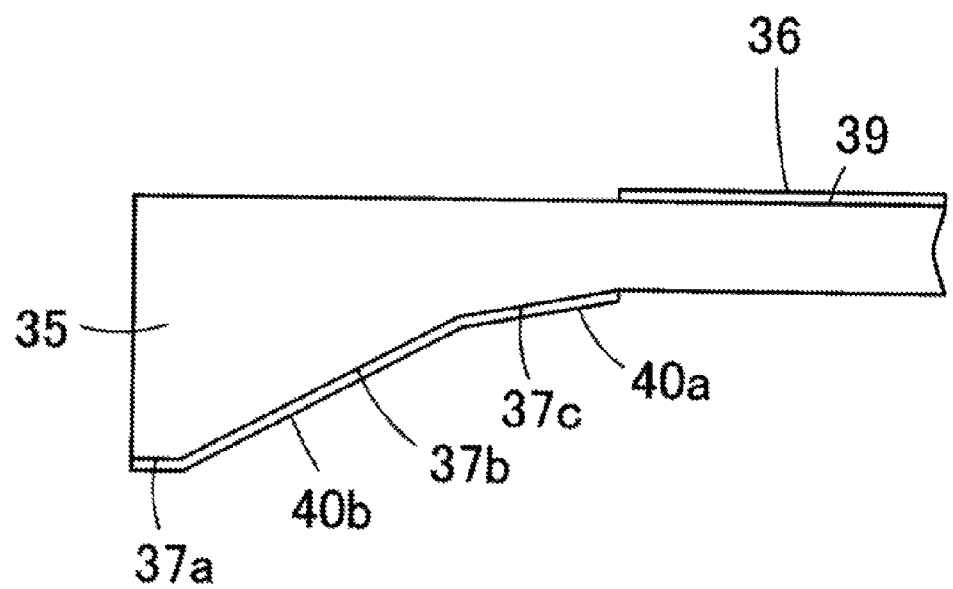

In FIG. 31B the horizontal surface 37*a*, the first slanted surface 37*b*, and the light diffusing patterns 40*b* are provided on the lower surface of the light conducting portion 35; the second slanted surface 37*c* and the directivity conversion patterns 40*a* are also provided on the lower surface.

Figure 31C:
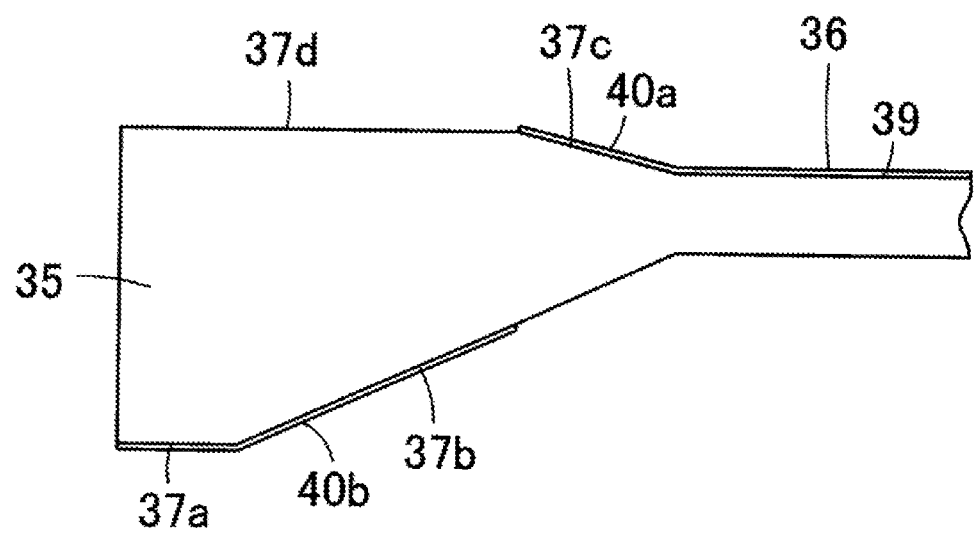

In FIG. 31C the horizontal surface 37*a*, the first slanted surface 37*b*, and the light diffusing patterns 40*b* are provided on the lower surface of the light conducting portion 35, while the second slanted surface 37*c* and the directivity conversion patterns 40*a* are provided on the upper surface of the light conducting portion 35. A horizontal surface 37*d*, which is longer than the horizontal surface 37*a*, is also provided at the end portion of the light conducting portion 35 on the upper surface thereof.

Additionally, although not depicted, the second slanted surface may be omitted. When the second slanted surface is omitted, because this results in the directivity conversion patterns 40*a* being provided on the same flat surface as the outer surface of the main light guiding body 34, the directivity conversion patterns 40*a* become triangular pyramids with slanted ridges.

Figure 32:
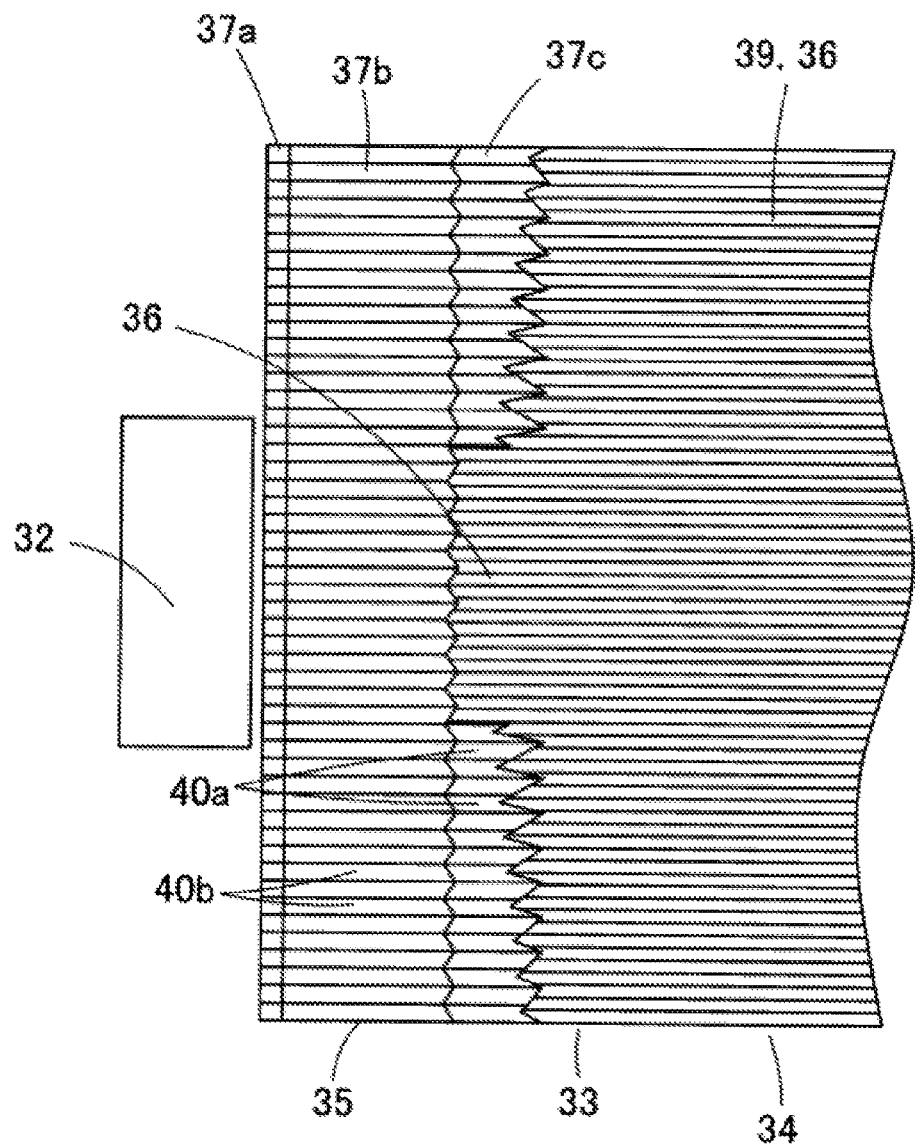
FIG. 32 is a broken-off plan view of a surface illumination device according to another embodiment.

FIG. 32 is a broken-off plan view of a surface illumination device according to another embodiment. In the embodiment illustrated in FIG. 32, the directivity conversion patterns 40*a* are only arranged on both sides on the second slanted surface 37*c*; no directivity conversion patterns 40*a* are placed at the center of the second slanted surface 37*c* (i.e., in front of the light source 32). Excluding the directivity conversion patterns 40*a* allows the directivity conversion patterns 40*a* to diffuse the light in the center portion and prevents darkening of the area in front of the light source 32. The second slanted surface 37*c* may also be omitted from the region having no directivity conversion patterns 40*a*, making the region as flat as the light output surface 39. In other words, the second slanted surface 37*c* may be provided on just the side portions. When excluded, according to one or more embodiments of the present invention, the directivity conversion patterns 40*a* are excluded from the entire region sandwiched between the optical axis C and the dividing line J. Moreover, in the embodiment illustrated in FIG. 32, the lenticular lens 36 may extend into a region from which the directivity conversion patterns 40*a* are omitted (or, a region with directivity conversion patterns 40*a* on both sides).

Figure 33:
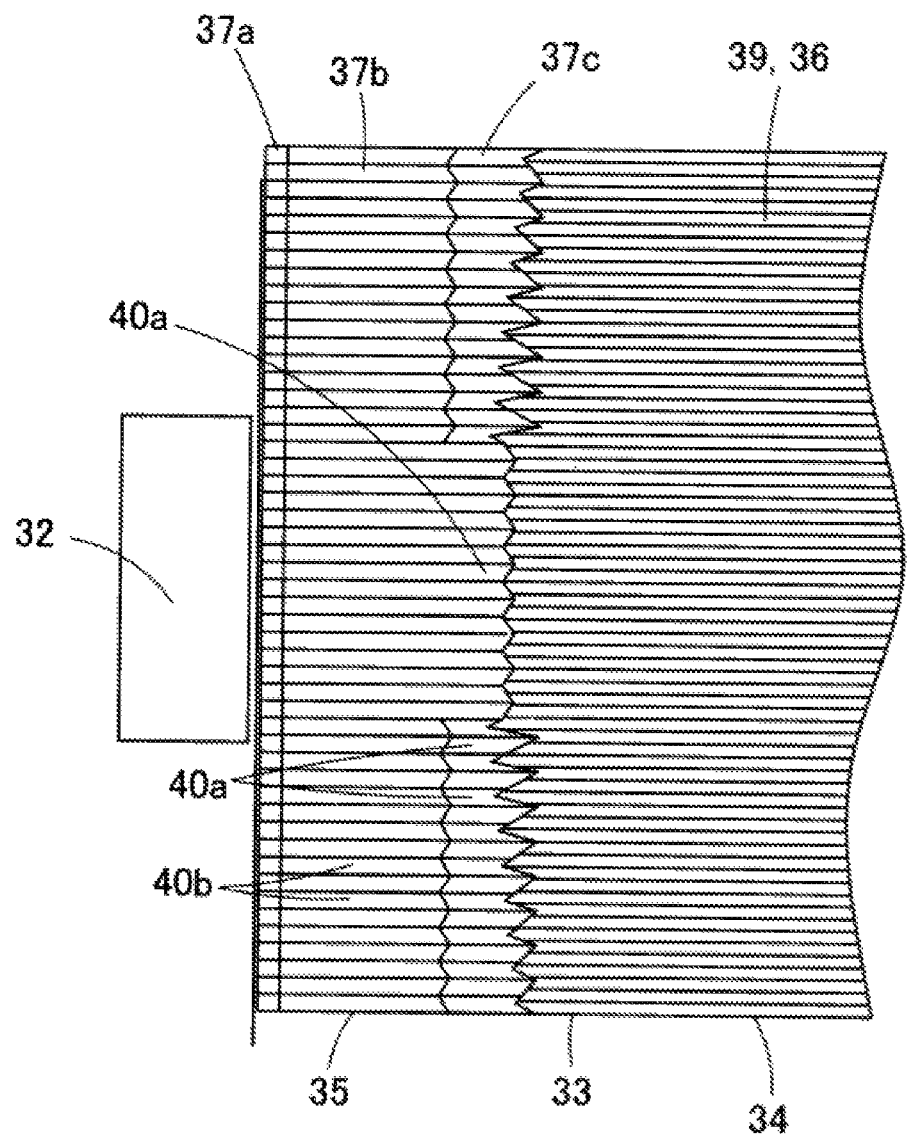
FIG. 33 is a broken-off plan view of a surface illumination device according to another embodiment.

FIG. 33 is a broken-off plan view of a surface illumination device according to another embodiment. As with the embodiment illustrated in FIG. 32, the directivity conversion patterns 40*a* are also only arranged on both sides on the second slanted surface 37*c*; no directivity conversion patterns 40*a* are placed at the center of the second slanted surface 37*c* (i.e., in front of the light source 32). When excluded, according to one or more embodiments of the present invention, the directivity conversion patterns 40*a* are also excluded from the entire region sandwiched between the optical axis C and the dividing line J. Additionally, in the embodiment illustrated in FIG. 33, the first slanted surface 37*b* may extend into a region from which the directivity conversion patterns 40*a* are omitted (or, a region with directivity conversion patterns 40*a* on both sides). Moreover, light diffusing patterns 40*b* may extend into said region on the upper surface of the first slanted surface 37*b* extended in the same manner.

Liquid Crystal Display Device

Figure 34:
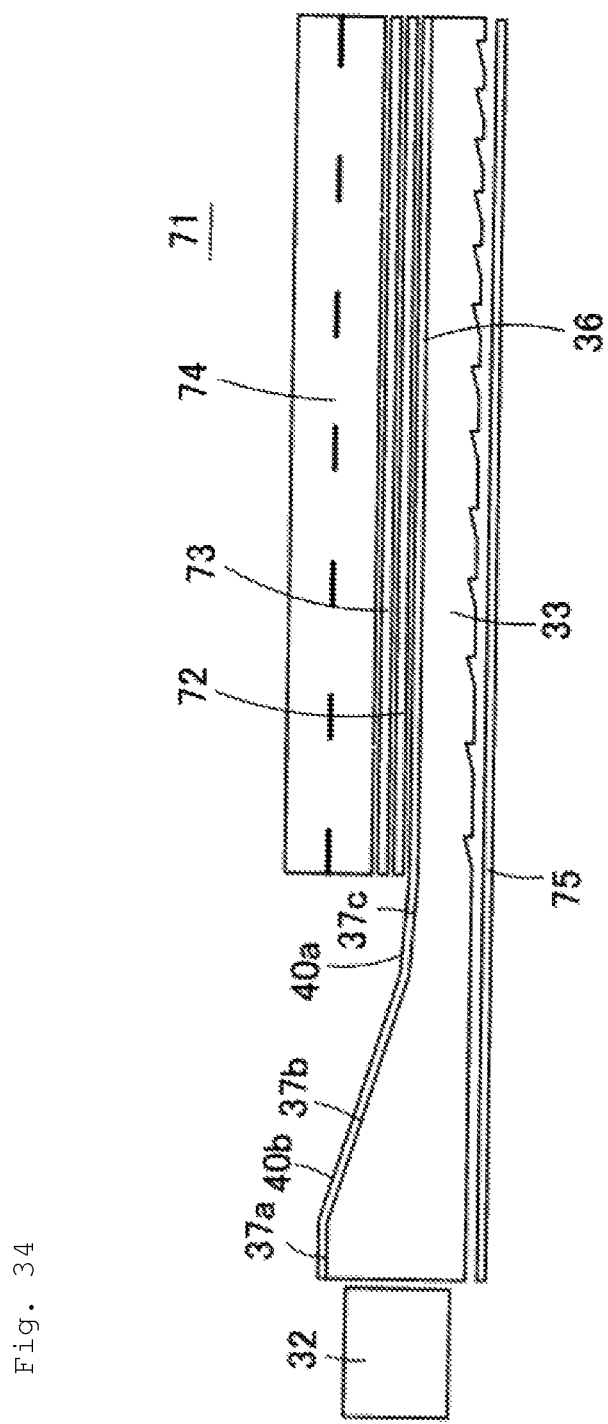
FIG. 34 is a schematic cross-sectional view of a liquid crystal display device adopting one or more embodiments of the invention.

FIG. 34 is a cross-sectional view schematically illustrating a liquid crystal display device that employs a surface illumination device according to one or more embodiments of the present invention. The liquid crystal display device 71 employs, for instance, the surface illumination device 31 according to the first embodiment. The liquid crystal display device 71 contains a diffusion plate 72, a prismatic sheet 73, and a liquid crystal panel which are arranged to overlap each other opposite the light output surface of the light guide plate 33. A reflective sheet 75 is arranged at the rear surface of the light guide plate 33. The features of the surface illumination device according to one or more embodiments of the present invention may be utilized to prevent the generation of uneven luminance on the screen of the liquid crystal display device, to thereby improve the image quality of the liquid crystal display device.

Mobile Device

Figure 35:
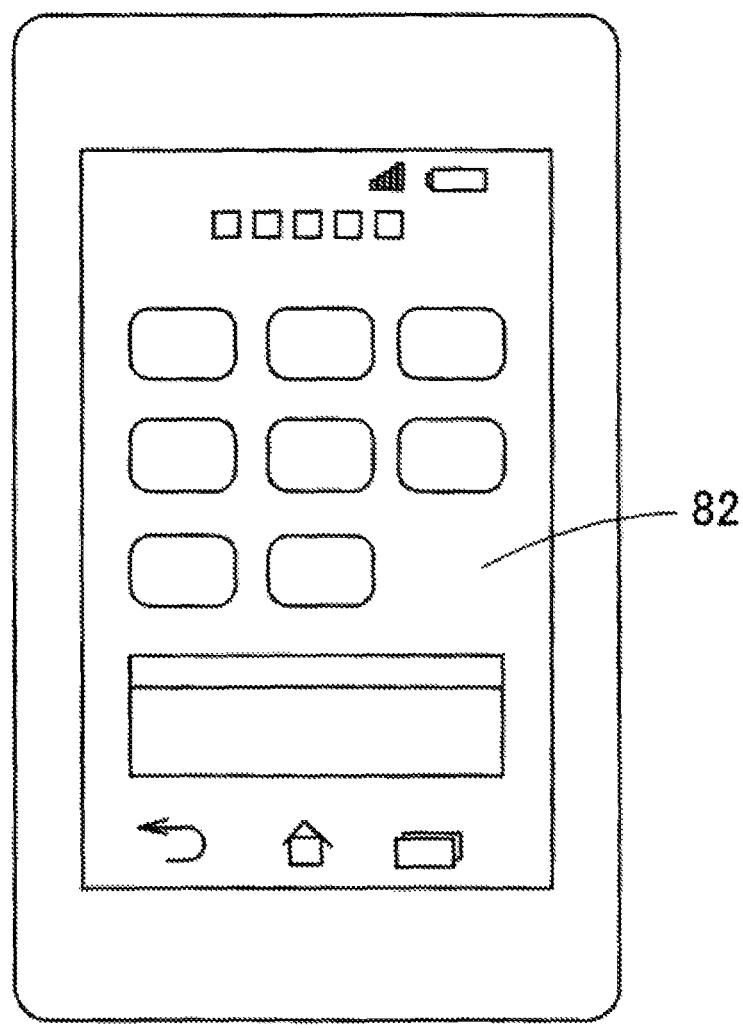
FIG. 35 is a front view of a mobile device according to one or more embodiments of the invention.

FIG. 35 illustrates a mobile device the uses a surface illumination device or a liquid crystal display device according to one or more embodiments of the present invention. Namely, FIG. 35 is a plan view of a smartphone 81 provided with a liquid crystal display device 82 with a touch screen integrated in the front surface. The surface illumination device according to one or more embodiments of the present invention may be used in the smartphone 81 to suppress uneven luminance on the screen and thereby improve the appearance of both display screens. Finally, the surface illumination device according to one or more embodiments of the present invention may be adopted in other mobile devices such as tablet computers, electronic dictionaries, electronic book readers, and the like, besides portable phones such as smartphones.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A light guide plate comprising:
    a light input end surface from which light is introduced;
    a light output surface that outputs light spread in a planar manner externally;
    a main light guiding body that is flat and including the light output surface;
    a light conducting portion that has a maximum thickness greater than the thickness of the main light guiding body and includes the light input end surface;
    a first slanted surface provided on the light conducting portion on at least one of a surface near the light output surface and a surface opposite thereto, the first slanted surface inclined from a first location that is thicker than the main light guiding body toward the outer surface of the main light guiding body; and
    a plurality of first pattern elements provided on the light conducting portion on at least one of a surface near the light output surface and a surface opposite thereto,
    wherein the first pattern elements are provided between a second location that is thicker than the main light guiding body and closer to the main light guiding body than the first location, and the end portion of the main light guiding body,
    wherein each of the first pattern elements extends parallel to a direction orthogonal to the light input end surface when the light output surface is viewed orthogonally,
    wherein ridges on the first pattern elements incline from the second location toward the outer surface of the main light guiding body; and
    wherein, when the main light guiding body is viewed from a side surface, the first pattern elements or the ridges between the first pattern elements incline at an average inclination smaller than the maximum inclination of the first slanted surface.

2. The light guide plate according to claim 1, wherein the average inclination of the first pattern elements or the ridges between the first pattern elements is no more than 3.5°.

3. The light guide plate according to claim 1, wherein with the outer surface of the main light guiding body as a reference the height of the second location is no more than one third the height of the first location.

4. The light guide plate according to claim 1 further comprising:
    a second slanted surface provided on the light conducting portion on at east one of a surface near the light output surface and a surface opposite thereto,
    wherein the second slanted surface is inclined from the second location toward the outer surface of the main light guiding body; and
    the average inclination of the second slanted surface is smaller than the maximum inclination of the first slanted surface, and the plurality of first pattern elements is formed on the second slanted surface.

5. The light guide plate according to claim 4, wherein the average inclination of the second slanted surface is no more than 3.5°.

6. The light guide plate according to claim 4, wherein the vertical interval of the second slanted surface is no more than one third of the vertical interval between the outer surface at the thickest location of the light conducting portion and the outer surface at the thinnest location of the light conducting portion.

7. The light guide plate according to claim 1 wherein a plurality of second pattern elements is formed on the first slanted surface.

8. The light guide plate according to claim 7, wherein the first pattern elements or the ridges between adjacent first pattern elements, and the second pattern elements or the ridges between adjacent second pattern elements appear to include first pattern elements or ridges between adjacent first pattern elements, and second pattern elements or ridges between adjacent second pattern elements that are arranged along a straight line when the outer surface of the main light guiding body is viewed from a direction orthogonal thereto.

9. The light guide plate according to claim 8, wherein a pitch at which the first pattern elements are arranged is half a pitch at which the second pattern elements are arranged.

10. The light guide plate according to claim 8,
    wherein a pitch at which the first pattern elements are arranged differs from a pitch at which the second pattern elements are arranged, and
    wherein the first pattern elements or the ridges between adjacent first pattern elements, and the second pattern elements or the ridges between adjacent second pattern elements are periodically arranged along a straight line.

11. The light guide plate according to claim 1, wherein for at least a portion of the first pattern elements the cross sections of the first pattern elements are parallel to the light input end surface are asymmetrical.

12. The light guide plate according to claim 11,
    wherein each of the first pattern elements is composed of at least two inclined surfaces having different inclination directions,
    wherein the plurality of first pattern elements is arranged along the width direction on the second slanted surface,
    wherein, in a cross section of the first pattern elements parallel to the light input end surface, when a normal line is projected from each of the inclined surfaces in the first pattern element from the inside to the outside, and
    wherein, in regions sandwiching a center line passing through the center of and orthogonal to the light input end surface, in each region the total of the transverse widths for the inclined surfaces where the normal lines projecting therefrom inclines towards the center line is larger than the total of the transverse widths for the inclined surfaces where the normal line projecting therefrom inclines in an opposite direction away from the center line.

13. The light guide plate according to claim 11,
    wherein a first pattern element is composed of at least two inclined surfaces having different inclination directions, and the plurality of first pattern elements is arranged along the width direction on the second slanted surface, and wherein, in a cross section of the first pattern elements parallel to the light input end surface, when a normal line is projected from each of the inclined surfaces in the first pattern element from the inside to the outside, in regions sandwiching a center line passing through the center of and orthogonal to the light input end surface, in each region the average angle of the angles formed between the normal line belonging to an inclined surface where the normal line projecting therefrom is inclined in the opposite direction away from the center line and a direction orthogonal to the light output surface is greater than the average angle of the angles formed between the normal line belonging to an inclined surface where the normal line projecting therefrom is inclined toward the center line and a direction orthogonal to the light output surface.

14. The light guide plate according to claim 1, wherein when regions bordering both sides of a center line passing through the center of and orthogonal to the light input end surface are divided by a dividing line located between the center line and a side surface of the light guide plate equidistant from the center line and the side surface and parallel to the center line, the total surface area of a region between the center line and the dividing line containing the first pattern elements is smaller than the total surface area of a region between the dividing line and the side surface containing the first pattern elements.

15. The light guide plate according to claim 14, wherein no first pattern elements are provided in a region containing the center line.

16. The light guide plate according to claim 14, wherein no first pattern elements are provided in a region sandwiched between the two dividing lines located on each side of the center line.

17. The light guide plate according to claim 1, wherein the first pattern elements are V-shaped grooves.

18. The light guide plate according to claim 17, wherein an apex angle between adjacent first pattern elements is 90° to 170°, inclusive.

19. The light guide plate according to claim 17,
wherein a plurality of second pattern elements is formed on the first slanted surface, the second pattern elements are V-shaped grooves; and
wherein an apex angle between adjacent first pattern elements is equal to or greater than an apex angle between adjacent second pattern elements.

20. The light guide plate according to claim 1, wherein the light output surface includes a plurality of lenticular lens shapes.

21. The light guide plate according to claim 20, wherein the end portions of the plurality of lenticular lens and the end portions of the plurality of first pattern elements intersect.

22. A surface illumination device comprising:
a light source, and
the light guide plate according to claim 1,
wherein the light source is arranged opposite the light input end surface of the light guide plate.

23. The surface illumination device according to claim 22,
wherein a plurality of individual light sources are arranged at a location opposite the light input end surface; and
taking an arrangement interval between the light sources as P, and a refractive index of the light guide plate as n, the plurality of first pattern elements are within a region that is a distance:

$$P/(2 \cdot \arcsin(1/n))$$

from the front surfaces of the light sources.

24. A liquid crystal display device comprising:
the surface illumination device according to claim 22, and
a liquid crystal panel.

25. An electronic device comprising:
the liquid crystal display device according to claim 24.

26. A mobile device comprising:
the liquid crystal display device according to claim 24.

* * * * *

UNITED STATES PATENT AND TRADEMARK OFFICE
CERTIFICATE OF CORRECTION

PATENT NO.           : 9,810,945 B2
APPLICATION NO.      : 14/919294
DATED                : November 7, 2017
INVENTOR(S)          : Gouo Kurata It is certified that error appears in the above-identified patent and that said Letters Patent is hereby corrected as shown below:

In the Claims

At Column 21, Claim number 4, Line number 63, the word "east" should read --least--.

Signed and Sealed this
Sixth Day of February, 2018

Joseph Matal
*Performing the Functions and Duties of the
Under Secretary of Commerce for Intellectual Property and
Director of the United States Patent and Trademark Office*